(12) United States Patent
Berggren et al.

(10) Patent No.: US 9,112,347 B2
(45) Date of Patent: Aug. 18, 2015

(54) DC GRID AND A METHOD OF LIMITING THE EFFECTS OF A FAULT IN A DC GRID

(75) Inventors: Bertil Berggren, Västerås (SE); Jurgen Häfner, Ludvika (SE); Lars-Erik Juhlin, Ludvika (SE); Kerstin Linden, Ludvika (SE); Lidong Zhang, Västerås (SE)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/004,643

(22) PCT Filed: Mar. 11, 2011

(86) PCT No.: PCT/EP2011/053746
§ 371 (c)(1),
(2), (4) Date: Sep. 11, 2013

(87) PCT Pub. No.: WO2012/123015
PCT Pub. Date: Sep. 20, 2012

(65) Prior Publication Data
US 2014/0002943 A1    Jan. 2, 2014

(51) Int. Cl.
*H02H 9/02* (2006.01)
*H02H 7/26* (2006.01)
(52) U.S. Cl.
CPC *H02H 9/02* (2013.01); *H02H 7/268* (2013.01)
(58) Field of Classification Search
CPC ...................................................... H02H 9/02
USPC ........................................ 361/79, 86, 87, 93.9
See application file for complete search history.

(56) References Cited

U.S. PATENT DOCUMENTS

| | | | | |
|---|---|---|---|---|
| 5,999,388 A | * | 12/1999 | Asplund | 361/58 |
| 2010/0046123 A1 | * | 2/2010 | Fukami | 361/18 |

FOREIGN PATENT DOCUMENTS

| | | |
|---|---|---|
| EP | 0 867 998 A1 | 9/1998 |
| WO | WO 2010/115452 A1 | 10/2010 |

OTHER PUBLICATIONS

Lianxiang Tang et al., "Locating and Isolating DC Faults in Multi-Terminal DC Systems", IEEE Transactions on Power Delivery, vol. 22, No. 3, pp. 1877-1884, Jul. 3, 2007.
Lianxiang Tang et al., "Protection of VSC-Multi-Terminal HVDC against DC Faults" Power Electronics Specialists Conference [Annual Power Electronics Specialists Conference], vol. 2, pp. 719-724, Jun. 23, 2002.

* cited by examiner

*Primary Examiner* — Thienvu Tran
*Assistant Examiner* — Tien Mai
(74) *Attorney, Agent, or Firm* — Birch, Stewart, Kolasch & Birch, LLP

(57) ABSTRACT

A DC grid (100) comprising a plurality of AC/DC converters (105) which are interconnected via DC lines (115) is provided, wherein, in order to limit the effects of a fault in the DC grid, the DC grid is divided into at least two zones (200) by means of at least one current limiter (205) in a manner so that a current limiter is connected in each of the DC line(s) (115*z*) by which two zones are interconnected. A method of limiting the effects of a fault in a DC grid by dividing the DC grid into at least two zones is also provided.

18 Claims, 12 Drawing Sheets

205

205

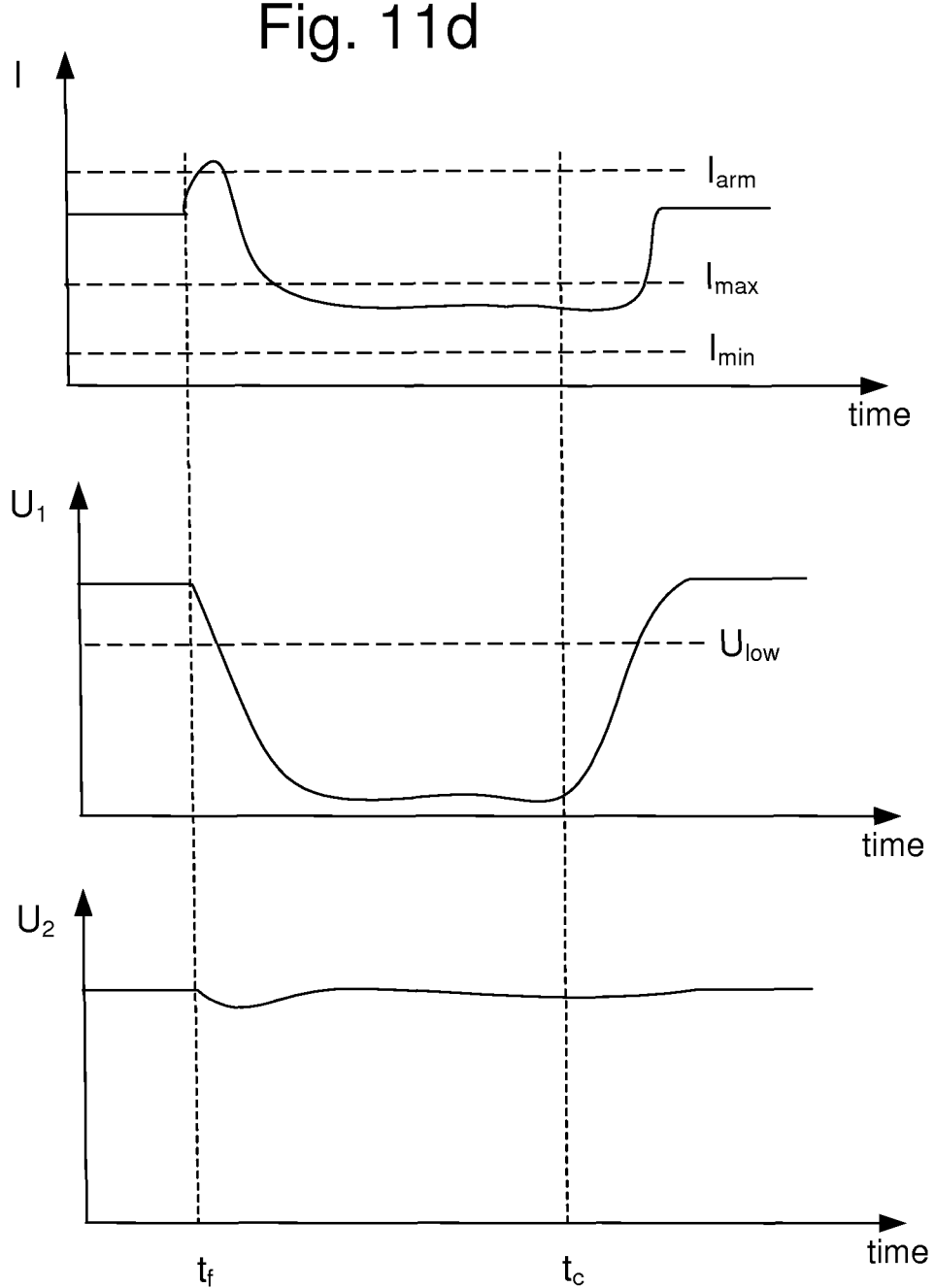

DC GRID AND A METHOD OF LIMITING THE EFFECTS OF A FAULT IN A DC GRID

TECHNICAL FIELD

The present invention relates to the field of power transmission, and in particular to power transmission using High Voltage Direct Current (HVDC) technology.

BACKGROUND

Transmission of power over long distances can advantageously be performed using HVDC transmission lines. In an AC transmission system, the transmission losses are dependent on both active and reactive power transfers. For long transmission lines, the losses due to the reactive power transfer will be significant. In an HVDC transmission system, on the other hand, only active power is transferred. The losses in an HVDC transmission line will thus be lower than the losses in an AC transmission line of the same length. For long distance transmission, the higher investment of necessary conversion equipment in an HVDC system is often justified.

Most HVDC transmission systems in use today are point-to-point transmission systems, where electric power is transmitted from one AC system to another. This is an efficient way of transmitting electrical power to/from remote areas, across water, between two unsynchronized AC grids, etc. In many circumstances, however, multi-point HVDC transmission systems, where power can be transmitted to/from at least three different points in one or several AC networks, are desired. A multi-point HVDC transmission system will here be referred to as a DC grid. One example of when a DC grid can be useful is when connecting (multiple) off-shore wind farms to (multiple) on-shore power grids. Another example is when transferring large amounts of power over long distances in existing AC grids, in which case low loss transmission can be achieved by using a DC grid as a backbone or over-lay grid to the existing AC grids.

A drawback of DC transmission as compared to AC transmission is that the interruption of a fault current is more difficult. A fault current in an AC system inherently exhibits frequent zero crossings, which facilitate for fast current interruption. In a DC system, no inherent zero crossings occur. In order to break a DC current, a zero crossing of the DC current generally has to be forced upon the system.

Moreover, in an AC system, the fault current will be limited by the reactance of the transmission lines. In a DC system on the other hand, the inductance of a transmission line will only matter in the transient stage. When the transient (quite quickly) diminishes, only the resistance of the lines will limit the level of the fault current on the DC side. Thus, the fault current can grow very rapidly in a DC grid. A fast breaking of a fault current is therefore desired.

Furthermore, power from the AC side will be fed into a fault that occurs on the DC side. Typically, this implies that the fault currents are high on the DC side, whereas the DC voltages are low throughout the DC grid, making organized power transfer impossible during the faulted time period. This is particularly pronounced when at least some of the converters are based on Voltage Source Converter (VSC) technology, since the switches of a VSC converter will typically have to be blocked when the current rises above a certain level, leaving the VSC converter basically operating as a diode bridge. The more converters that are connected to the DC grid, the higher the DC current in the fault. The situation of having depressed DC voltages, with the consequential power transfer inability, may, if prolonged, have serious impact on the AC system stability. AC system instability would result in black-outs, which are very costly for society. In order to prevent AC system instability, the AC systems could be designed with substantial reserve transfer capability. However, such over-dimensioning of the AC systems is very costly and generally not desired. Hence, a fast breaking of a DC fault current, before the DC voltages have collapsed, is desired.

Thus, in order to limit the effects of a line fault, an HVDC breaker should react very fast, typically in the transient stage while the fault current still is increasing and before the DC voltages have collapsed too much. Efforts have been put into the development of fast and reliable HVDC breakers, and the HVDC breakers that currently provide the fastest interruption of current are based on semi-conducting technology. A semi-conductor HVDC breaker is for example disclosed in EP0867998. However, semi-conductor HVDC breakers experience a power loss which is higher than in a mechanical breaker. Furthermore, semi-conductor HVDC breakers designed to break large currents are considerably more expensive than mechanical breakers. However, existing mechanical breakers cannot provide sufficient breaking speed. Thus, there is a need for cost- and energy effective fault current handling in a DC grid.

SUMMARY

A problem to which the present invention relates is how to efficiently limit the negative consequences of a fault occurring in a DC grid.

This problem is addressed by a DC grid comprising a plurality of AC/DC converters which are interconnected via DC lines, wherein the DC grid further comprises at least one current limiter, and wherein the DC grid is divided into at least two zones by means of the at least one current limiter in a manner so that a current limiter is connected in each of the HVDC line(s) by which two zones are interconnected.

By dividing the DC grid into different zones which are interconnected by means of a current limiter, the effects of a fault in the DC grid can be limited. If a fault occurs in a first zone, the current limiter(s) that interconnect this first zone 200 with its neighbouring zones will limit the fault current that flows into the fault from the neighbouring zones during the fault-on period, thus reducing the fault current in the zone wherein the fault has occurred. Moreover, limiting of the fault current will mitigate the effects in the healthy zones surrounding the faulty zone. If the fault current is permitted to flow undisturbed, the DC voltage in the surrounding zones 200 will collapse, making continued power transmission more or less impossible. Such voltage collapse will typically, unless measures are taken, reach a large geographical spread very quickly after a fault has occurred. By limiting the fault-current caused by a fault in a first zone, the DC voltage in the surrounding zones 200 can be essentially undisturbed, and the power transmission in the surrounding zones 200 may continue without major interruption.

The problem is further addressed by method of limiting the effects of a fault in a DC grid comprising a plurality of AC/DC converters which are interconnected via DC lines. The method comprises dividing the DC grid into at least two zones by series-connecting at least one current limiter in each of the DC line(s) by which two zones are interconnected.

The DC grid can for example comprise a control-system in connection with at least one zone-dividing current limiter, where such control system is operable to control the current-limiting strength of the current limiter.

In one embodiment of the method, the method further comprises detecting, in such control system, a fault. The method further comprises, in response to the detection of a fault, adjusting the current-limiting strength of the current limiter in a manner so that, if the current through the current limiter exceeds a first current threshold ($I_{max}$), the current-limiting strength is increased; and if the current through the current limiter falls below a second current threshold level ($I_{min}$), the current-limiting strength is decreased.

The detection of a fault could be based on checking if the voltage on a side of the current limiter has fallen below a first voltage threshold, which would indicate that a fault has occurred if the first voltage threshold is set at a value below the voltage at normal operation. Alternatively, when the first and second current thresholds lie above the rated current of the transmission, the detection of a fault could be based on checking if the current through the current limiter has risen above the first current threshold.

Both the first and second current thresholds, defining a regulation range, could lie above the rated current of the transmission. A higher charge of the cables and/or overhead-lines forming the DC lines in the faulty zone will be provided once the fault has been cleared than if the regulation range lies below the rated current. A speedy return of the healthy part of the faulty zone to normal operation can thus be performed.

In another implementation, the regulation range lies below the rated current of the transmission. In this implementation, the generated power loss in the current limiter(s) 205 will be lower than when the regulation range lies above the rated current, thus allowing for a design of the current limiter(s) that have a lower energy-absorbing capacity, and/or for a longer period of time during which a current limiter can carry a current. A lower fault-current level also yields a lower requirement on current-breaking capacity of DC breakers present in the DC grid. Furthermore, a lower power loss in the current limiter may yield a more stable operation of the healthy zones during the fault-on period, since the power lost will have to be provided by the surrounding zones.

In one embodiment, a current limiter comprises a series connection of independently controllable breaker sections, wherein a breaker section comprises a parallel connection of a non-linear resistor and a semi-conductor switch of turn-off type. The current-limiting strength of such current limiter can be varied by varying the number of breaker sections which are open, and thus have a non-linear resistor which is switched in (i.e. forms part of the current path through the current limiter). The current limiter can alternatively be a superconducting conductor, or any other current limiting device.

In one aspect of this embodiment, the present energy-absorbing capacity of the non-linear resistors is estimated; and a selection of which breaker section(s) should be opened or closed, if any, is made in dependence of the different energy absorbing capacities of the non-linear resistors. An efficient utilization of the energy-absorbing capacity of the current limiter is thus achieved.

Further aspects of the invention are set out in the following detailed description and in the accompanying claims.

BRIEF DESCRIPTION OF THE DRAWINGS

FIGS. 11a-d illustrate the sequence of events in terms of current and voltage as a function of time for different embodiments of the method of determining the required current limiting strength of a current limiter.

DETAILED DESCRIPTION

Figure 1:
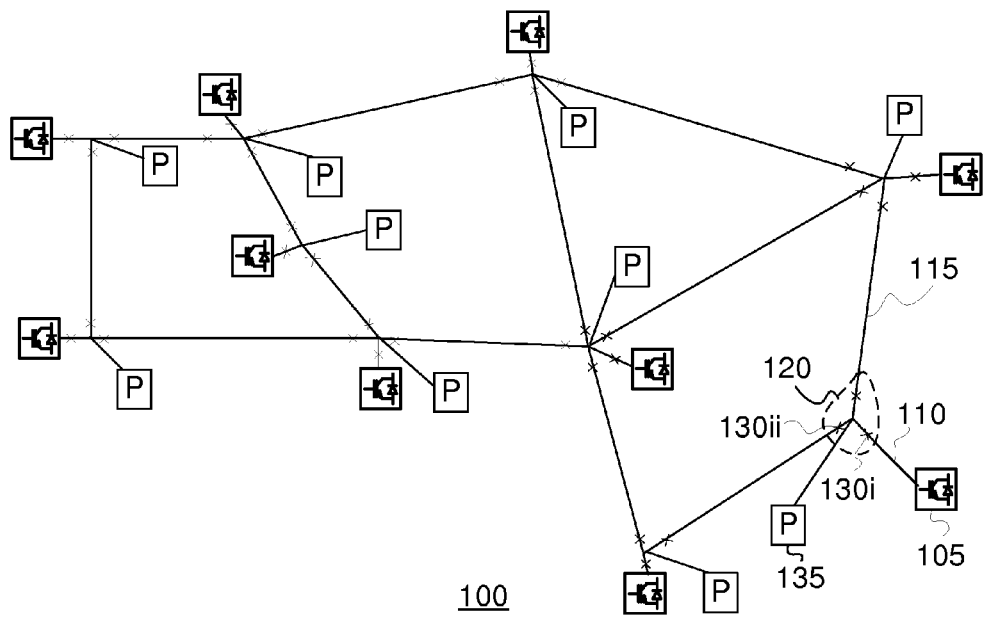
FIG. 1 is a schematic drawing of an example of a DC grid.

FIG. 1 is a schematic illustration of an example of a DC grid 100 for HVDC transmission. The DC grid 100 comprises ten different high voltage AC/DC converters 105, here referred to as HVDC converters 105, which are interconnected via DC switchyards 120 and DC lines 115 for high voltage transmission, here referred to as HVDC lines 115. A HVDC converter 105 is connected to an AC power system (not shown) at one end, and to a DC switchyard 120 via a connection 110 at the other end. In FIG. 1, the DC switchyards 120 have been shown to be of a single bus bar configuration for illustration purposes, but other configurations may alternatively be used, such as a double busbar, a two breaker switchyard, a one and a half breaker switchyard, etc. The HVDC lines 115 may be cable or overhead lines, or combinations thereof. Connections 110 and HVDC lines 115 can be bipolar or monopolar.

A converter 105 could for example be a Voltage Source Converter (VSC), or a Current Source Converter (CSC). In recent years, point-to-point HVDC transmission systems based Voltage Source Converter (VSC) have been developed. VSC technology is particularly advantageous for building DC grids, inter alia since the VSC technology allow for power reversal by simply performing a DC current reversal.

A connection 110 in a high voltage DC grid is typically connected to a DC switchyard 120 over a high voltage DC breaker 130i, hereinafter referred to as an HVDC breaker 130i. A connection between the HVDC converter 105 and an AC switchyard (at the other side of the HVDC converter 105)

is typically made over an AC breaker (not shown). An HVDC breaker 130ii is typically provided at the connection of a HVDC line 115 to a DC switchyard 120, so that each HVDC line 115 is equipped with two HVDC breakers 130ii, which are located at the respective ends of the HVDC line 115. In the following, when referring to HVDC breakers generally, the term HVDC breaker 130 will be used. The various HVDC breakers 130i and 130ii could, if desired, be implemented in the same manner, and the difference in reference numeral only indicates the difference in location in the DC grid topology.

A protection system 135 is typically provided at each switchyard 120, the protection system 135 being designed to detect a fault situation and to send, if required, a trip signal to the appropriate HVDC breaker(s) 130. Thus, in case of a fault on a HVDC line 115, the HVDC breakers 130ii at each end of the HVDC line 115 will receive a trip signal from such protection system 135. A line fault could e.g. be a pole-to-ground fault or a pole-to-pole fault, or a combination thereof. Similarly, if a fault is detected on the connection 110, or in the HVDC converter 105, the HVDC breaker 130i will receive a trip signal. In these latter scenarios, an AC breaker on the AC side will also receive a trip signal. However, in the following, for ease of description, reference will be made only to the tripping of HVDC breakers 130. A protection system 135 is typically designed to only remove the faulty piece of equipment in case of a fault, leaving the rest of the system intact after fault clearing. Protection systems are well known in the art, and typically comprise measurement equipment and software algorithms for the determination of existence of a fault. Such algorithms could for example be based on measurements of voltage and current, their magnitudes and/or their derivatives in various combinations, and/or on so called differential protection, which is based on comparisons of the current at each side of an object, such as an HVDC line 115 or a HVDC converter 105.

The DC grid 100 of FIG. 1 is an example only, and a DC grid 100 could comprise any number N of HVDC converters 105, where N≥3, interconnected in any fashion. A DC grid 100 typically comprises further equipment which has not been shown in FIG. 1, such as measurement devices, DC reactors, filters, etc.

As mentioned above, the speed at which the HVDC breakers 130 operate will determine how high a fault current will rise in the DC grid 100 before it is broken. It is generally desired to keep the breaking speed as high as possible. Today, HVDC breakers based on semi-conductor technology can be made sufficiently fast, with breaking speeds of as low as in the μs scale. However, since semi-conducting HVDC breakers based on power electronic technology are typically quite costly compared to less speedy alternatives, a way of efficiently limiting the negative consequences of a fault occurring in a DC grid 100, while using more slowly operating HVDC breakers, would be desired.

According to the invention, the DC grid 100 is divided into zones by means of at least one current limiter, in a manner so that a current limiter is connected in each of the HVDC line(s) 115 by which two zones are interconnected. Thus, current limiters can be said to define the borders of a zone. A zone-dividing current limiter 205 is typically connected between two DC switchyards 120.

Figure 2:
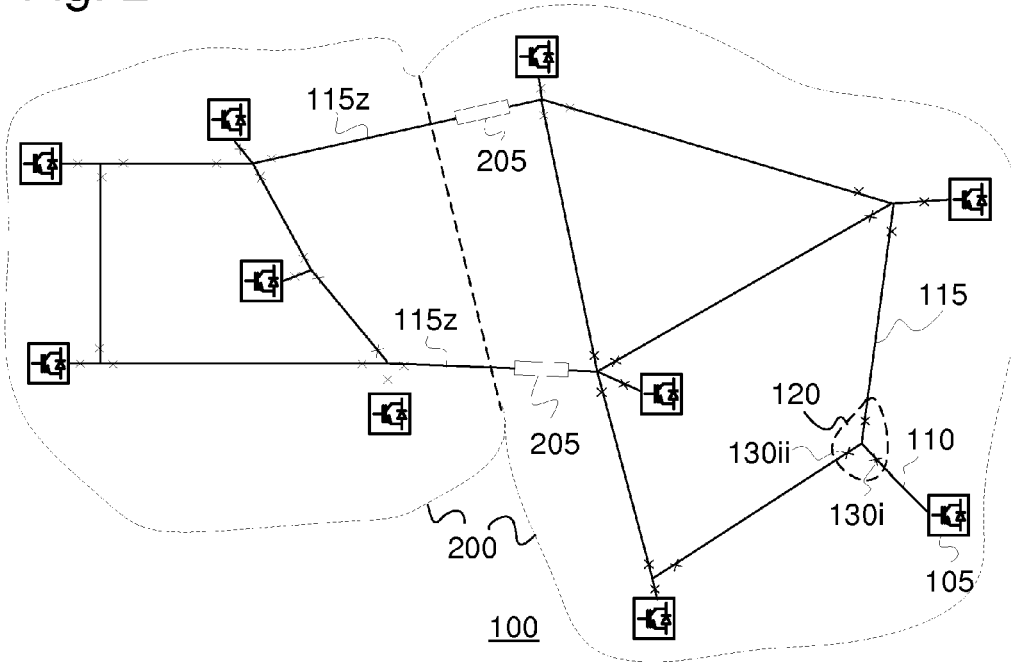
FIG. 2 is a schematic drawing of the DC grid of FIG. 1, where the DC grid has been divided into two zones by means of current limiters 205.

An example of a DC grid 100 which has been divided into zones is shown in FIG. 2, where two zones 200 have been indicated by dashed lines. Two HVDC lines 115 interconnect the two zones 200, and each of these HVDC lines 115 is equipped with a series connected current limiter 205. An HVDC line which is equipped with a zone-dividing current limiter 205 will in the following be referred to as a zone-dividing HVDC line 115z. In FIG. 2, the current limiters 205 have taken the place of the HVDC breaker 130ii in one end of the zone-dividing HVDC line 115z. For illustration purposes, no protection systems 135 have been shown in FIG. 2, although such protections systems would typically be present.

By dividing the DC grid into different zones 200 which are interconnected by means of a current limiter 205, the effects of a fault in the DC grid 100 can be limited. If a fault occurs in a first zone 200, the current limiter(s) 205 that interconnect this first zone 200 with its neighbouring zones 200 will, according to the invention, limit the fault current that flows into the fault from the neighbouring zones 200 during the fault-on period, thus reducing the fault current in the zone 200 wherein the fault has occurred. Moreover, limiting of the fault current will mitigate the effects in the healthy zones 200 surrounding the faulty zone 200. If the fault current is permitted to flow undisturbed, the DC voltage in the surrounding zones 200 will collapse, making continued power transmission more or less impossible. Since the resistance in the HVDC lines 115 is generally low, such voltage collapse will, unless measures are taken, reach a large geographical spread very quickly after a fault has occurred—often, the entire DC grid 100 is affected. By limiting the fault-current caused by a fault in a first zone 200, the DC voltage in the surrounding zones 200 can be essentially undisturbed, and the power transmission in the surrounding zones 200 may continue without major interruption.

Hence, the impact on AC system stability can be kept under control. In other words, the power transfer can be maintained in a large portion of the DC grid 100, even if a fault in the DC grid has occurred. Thus, the reserve transfer capacity in the connected AC systems can be substantially decreased compared to a system wherein no current limiters 205 have been implemented in the DC grid. In addition, the fault-on period with depressed voltages and inability to transfer power in the faulty zone can be allowed to be longer and thus, slower and less expensive HVDC breakers 130 can be used within the zones 200.

The clearing of a fault will be performed by tripping of the appropriate HVDC breakers 130 surrounding the faulty object. Such tripping will typically be initiated by the protection system 135 which monitors the faulty object. Objects wherein a fault could occur could for example be an HVDC line 115, an HVDC converter 105, a connection 110 or a DC switchyard 120.

By providing a limited contribution to the fault current through a zone-dividing HVDC line 115z, current from the zones 200 which surround the faulty zone 200 will contribute to the charging of the cables and/or overhead lines in the faulty zone, following clearing of the fault. Thus, normal operation can quickly be resumed also in the zone where the fault occurred, once the faulty object has been disconnected.

By using fast current limiters 205, other HVDC breakers 130 within the DC grid 100 can be of a design which provide slower operation. Since the fault current in a faulty zone 200 can be limited by means of the current limiters 205, HVDC breakers of comparatively low breaking speed can be used. Furthermore, the breaking capacity of the HVDC breakers 130 in the DC grid 100 can be reduced, since the currents to be broken, even if a fault situation occurs, will be lower. The breaking speed requirements on a HVDC breaker 130 in a DC grid 100 which is divided into zones 200 depends for example on for how long the current limiters 205 can operate to hold the current at an acceptable level; on the stability of the AC systems connected in the zone 200; to which current level the current limiters 205 control the current; and on the current-breaking capability on the HVDC breaker 130. Examples of suitable designs of HVDC breakers of lower breaking speed are e.g. mechanical HVDC breaker designs such as those described in "Cigré technical brochure 114, Circuit-breakers for meshed multiterminal HVDC systems", the breaking speed of which is in the range of an AC-breaker, e.g. 30-60 ms.

In the DC grid 100 illustrated in FIG. 2, the zone border, defined by the current limiters 205, crosses two HVDC lines 115. A zone border represents a transmission interface where current limiting possibilities are provided. A zone border may cross an arbitrary number of HVDC lines 115 (at least one), and each such zone-dividing HVDC line 115z should be equipped with a current limiter 205. Furthermore, zone 200 can border an arbitrary number of neighboring zones 200. The size (and thus the number) of the zones 200 will be designed based inter alia on the current-breaking capacity of the HVDC breakers 130, and on the AC system stability.

Figure 3A:
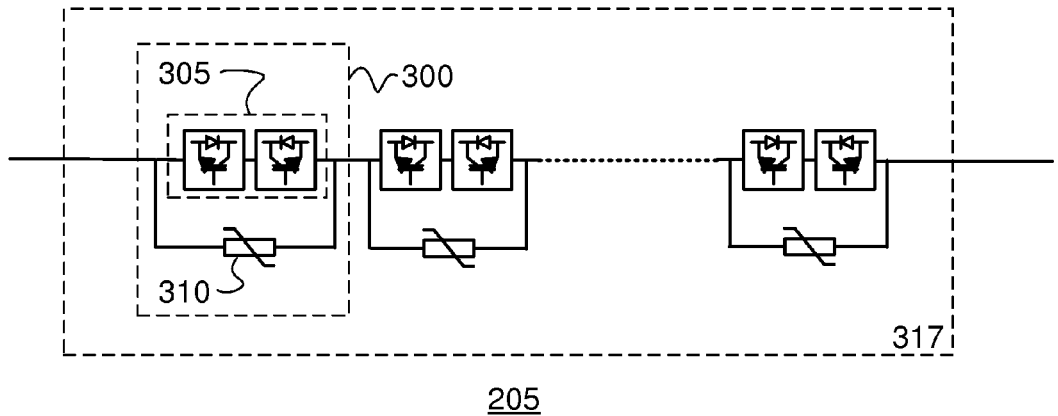
FIG. 3a illustrates an example of a current limiter based on a series connection of independently controllable breaker sections.

The current limiters 205, on the other hand, should be able to act fast, in order to avoid severe disturbances of the voltage on the healthy side of the current limiter 205 in case of a fault, as well as to avoid the rise of the fault current beyond acceptable levels. A high speed semi-conductor current limiter has been described in EP0867998, and an example of such a current limiter 205 is shown in FIG. 3a. The current limiter 205 of FIG. 3a comprises a set of n series-connected breaker sections 300, where each breaker section comprises a parallel connection of a non-linear, voltage-dependent resistor 310 and a semiconducting switch 305 of turn-off type. The breaker sections 300 can be controlled independently of each other. Here, a breaker section 300 having a semi-conducting switch 305 which is closed will be referred to as a closed breaker section 300, and vice versa. The different breaker sections 300 could be identical, although this is not a requirement.

In FIG. 3a, the semi-conducting switch 305 is a series connection of two anti-parallel, uni-directional switches of turn-off type, each being connected in anti-parallel with a rectifying element (e.g. a diode). In another implementation, the semi-conducting switch 305 could be bi-directional switch. Alternatively, two uni-directional current limiters could be series connected in anti-parallel to form the current limiter 205, where each has uni-directional switches 305 of a single direction. If uni-directional current limiting would be sufficient, such as if one of the zones inter-connected by a current limiter 205 is significantly more fault prone than the other, a single uni-directional current limiter could be sufficient. A semiconducting switch 305 of turn-off type could for example be of IGBT type (insulated-gate bipolar transistor), of IGCT type (integrated gate-commutated thyristor) or of GTO (gate turn-off thyristor) type. All these types belong to the group of power semiconductor switches with turn-on and turn-off capability, and other switches belonging to this group could also be used. (Typically, a semiconducting switch 305 is typically formed be a series- and/or parallel connection of a number of switching units.) The non-linear resistor 310 could for example be an arrestor, and could be made from e.g. zinc oxide or silicon carbide.

The fault current limitation functionality of the current limiter 205 of FIG. 3a is obtained by blocking the switches 305 in only a subset of the n sections (hereinafter, a breaker section 300 wherein the semi-conducting switch 305 is in a blocking state will be referred to as an open breaker section 300). The non-linear resistors 310 of the open section 300 set up a voltage which counteracts the flow of current through the non-linear resistors 310. The higher number of sections 300 that are opened, the smaller the current will be, with zero current as the extreme. By opening a suitable subset of the n series connected breaker sections 300, the counter voltage across the corresponding arrestors can be made smaller than the voltage required to break the current, but large enough to limit the current to a suitable level. However, as long as the current is only limited (rather than broken), the non-linear resistors 310 in the subset of open sections 300 will dissipate energy. The number n of sections 300 and the Switching Impulse Protection Level (SIPL) of each non-linear resistor 310 will determine the maximum voltage for which a current may be broken. In order to ensure that a fault current can be broken, the number n of section 300 could advantageously reach or exceed the number required for breaking a current at nominal voltage. However, if only current limiting properties are desired, and no breaking operation is expected from the current limiter 205, a smaller number of sections 300 could be used. A current limiter 205 which is capable of breaking the current can be referred to as a current limiting breaker.

On occurrence of a fault, the current limiters 205 will switch in non-linear resistors 310, to limit the current flowing into the faulted zone 200 so that it falls below a certain level, thus reducing the stress on (possibly simpler) HVDC breakers within the zone 200. As the current limiter 205 reduces the current by building up voltage across the non-linear resistors 310 of the open sections, the grid voltages outside the faulted zone 200 are maintained at a voltage close to the normal voltage, so that organized power transfer can be maintained in the rest of the DC grid 100.

Figure 3B:
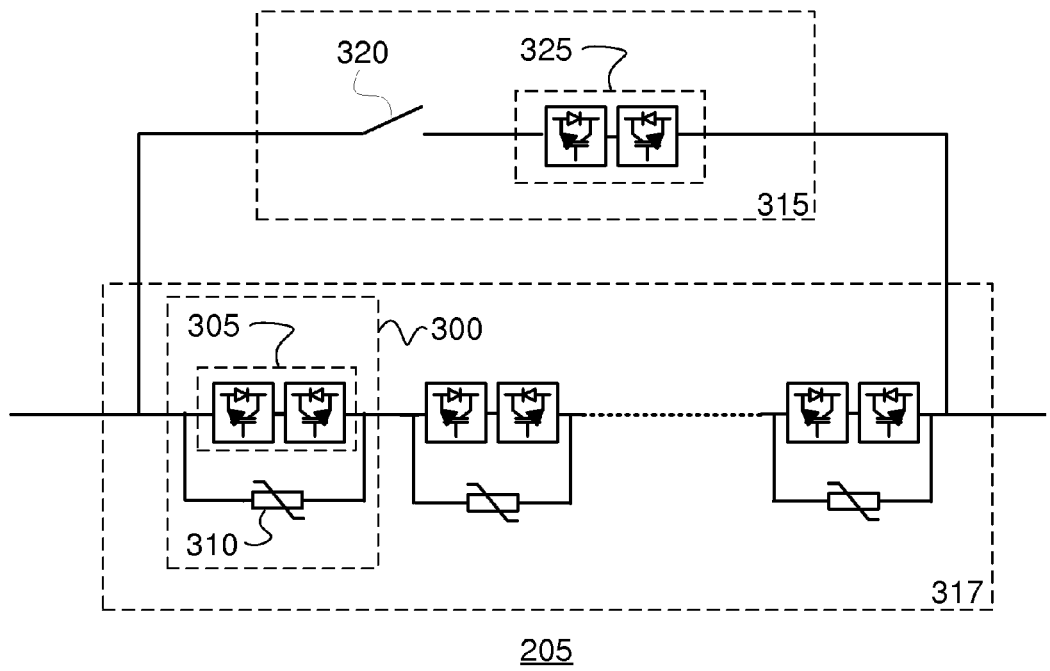
FIG. 3b illustrates an example of a current limiter including a transfer switch.

FIG. 3b schematically illustrates an alternative embodiment of a current limiter 205 of high speed, where the current limiter 205 of FIG. 3b comprises a transfer switch 315 which is connected in parallel with the series connection of breaker sections 300. The series connection of breaker sections 300 can in this configuration be referred to as the main switch 317. The transfer switch 315 comprises a series connection of an auxiliary switch 325 and a disconnector 320. During normal operation, the auxiliary switch 325 and the disconnector 320 are closed, so that the current through the current limiter 205 flows through the transfer switch 315 rather than through the main switch 317. The sections 300 of the main switch 317 can advantageously be open during normal operation.

Upon activation of the current limiter 205, either as to limit or break the current, the auxiliary switch 325 will be opened so that the current is commutated to the main switch 317. Before the auxiliary switch 325 is opened, the main switch 317 should be closed, if not closed during normal operation. When the auxiliary switch 325 has been opened to commutate the current to the main switch 317, the disconnector 320 will be opened, in order to isolate the auxiliary switch from any high voltages which will occur across the main switch 317. A suitable number of breaker sections 300 will then be activated in that the semi-conducting switch 305 of these breaker sections 300 will act to block the current, thus forcing the current to flow via the non-linear resistors 310. The main switch 317 of the current limiter 205 of FIG. 3b should not be activated until the disconnector 320 has been opened. Thus, a current limiter 205 which has a transfer switch 315 is generally slower than a current limiter 205 having a main switch 317 only. However, an indication that a fault has occurred will often have to be analyzed before a decision to limit (or break) the current will be taken. By using the time between receipt of such fault indication and the decision making for a preparatory opening of the transfer switch 315, the activation of the main switch 317 can often take place immediately upon a decision having been made. Advantageously, the opening of the transfer switch 315 could be performed upon receipt of a fault indication, and the activation of the main switch 317 upon receipt of a main switch activation decision. If no such decision is received, e.g. within a certain period of time, the transfer switch 315 could be closed.

The additional time required for opening of the transfer switch 315 may be beneficial for protection algorithms based on derivatives of voltages and/or currents, since the opening the transfer switch 315 would provide a time window with quickly changing currents and voltages, before current limitation occurs. Protection algorithms based on time derivatives would then be given time to identify the fault, and to send trip signals to the appropriate DC breakers 130. When no transfer switch 315 is provided, a time delay of appropriate duration could be introduced for this purpose, if desired. For some protection algorithms, such as differential protection algorithms, such time window of quickly changing currents and voltages are of no additional benefit.

The disconnector 320 of a transfer switch 315 should preferably be fast. Since there will be no current through the disconnector 320 while opening, a fast mechanical disconnector is somewhat easier to design than a fast mechanical breaker for breaking a current. An example of a suitable design of the disconnector 320 is disclosed in EP1377995.

By letting the current flow through the transfer switch 315 during normal operation, the power loss in the current limiter 205 can be considerably reduced as compared to a current limiter 205 having only the main switch 317. The auxiliary switch 325 can be considerably smaller than the main switch 317, and thus considerably less power consuming. However, in relation to the present invention, the transfer switch 315 is optional.

An advantage of using current limiters 205 based on a series connection of breaker sections 300 is that the current-limiting strength can easily be adjusted. Furthermore, if a sufficient number of breaker sections 300 are provided, such current limiter 205 can operate to break the current. However, this current limiter type is given as an example only, and other types of current limiting devices may be used, such as super-conducting conductors.

Figure 4:
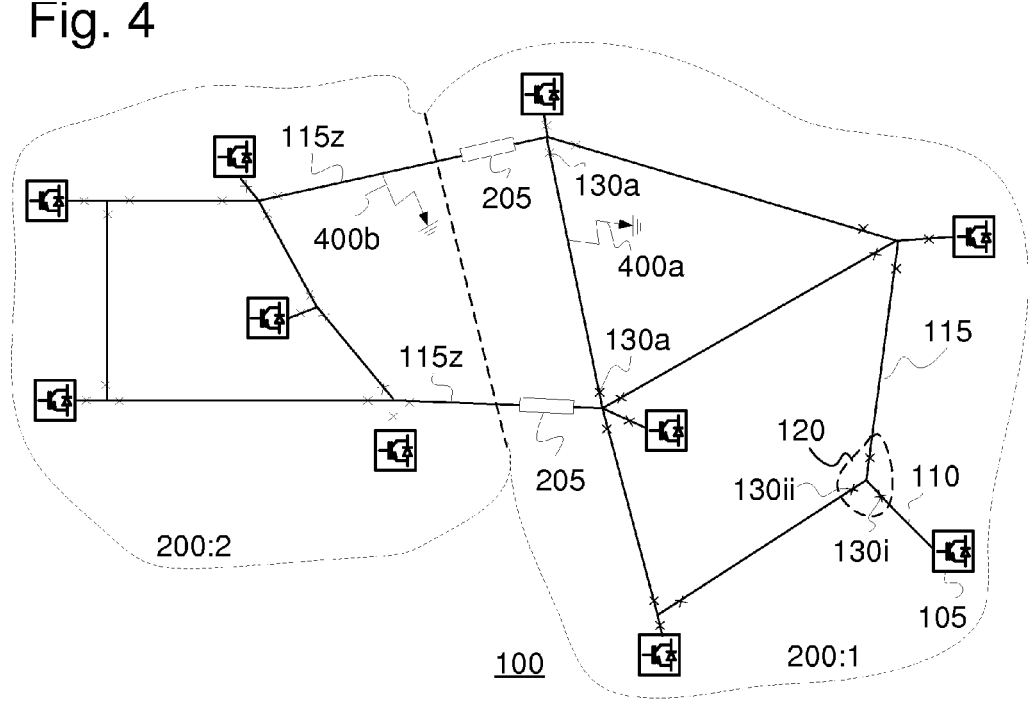
FIG. 4 illustrates the occurrence of two different line faults in the DC grid of FIG. 2.

Now returning to a DC grid 100 which is divided into zones 200 by means of current limiters 205. FIG. 4 shows the DC grid 100 of FIG. 2, wherein two different possible dc faults, 400a and 400b, have been indicated. DC fault 400a illustrates the situation where a fault occurs within a zone 200, which will hereinafter be referred to as a zone-internal fault 400a. DC fault 400b illustrates the situation where a line fault occurs along a zone-dividing HVDC line 115z, which will hereinafter be referred to as a zone-border fault 400b.

If a zone-internal fault 400a occurs in a first zone 200 (zone 200:1 in FIG. 4), the current limiters 205 defining the first zone 200 will operate to limit the current. The current limiters 205 have a control system arranged to detect a fault, and to activate the current limiting functionality of the current limiter 205 in response to the detection of a fault, as described in relation to FIG. 5. During the fault-on period, the fault-current contribution from the surrounding zones (zone 200:2 in FIG. 4) to the zone 200 wherein the fault has occurred will thus be limited, improving the situation for the HVDC breakers 130 in the faulty zone 200. Furthermore, the DC voltages in the surrounding zones 200 will essentially be undisturbed, and operation in the surrounding zones 200 may continue without major disruption.

Once the fault current has been limited by means of the current limiters 205, the HVDC breakers 130 which are connected around the faulty object can clear the fault. In the example given in FIG. 4, this corresponds to opening of the HVDC breakers 130 connected in the faulty HVDC line 115.

Once the HVDC breakers 130 surrounding the fault have successfully been opened and thereby act to isolate the fault 400a, the breaker sections 300 of the current limiters 205 can be returned to the closed state. The DC voltages in the first zone 200 will start to increase again, and the fault-current contribution from the surrounding zones 200 will tend to decrease. The instruction to commence closing the breaker sections 300 will be generated locally by the control system of the respective current limiters 205, as further described in relation to FIG. 5.

The control system arranged to activate current limitation of a current limiter 205 is advantageously independent on the protection systems 135, and vice versa. The tripping of the HVDC breakers 130 in response to a fault will thus be independent on the activation of the current limiter 205. Depending on the implementation, the tripping of the HVDC breakers 130 will be initiated at the same time as, before, or after the activation of the current limiters 205. The activation and control of the current limiter 205 can advantageously be trigger in dependence of local measurements of voltage/and or current, obtained at the location of the current limiter 205.

Figure 5:
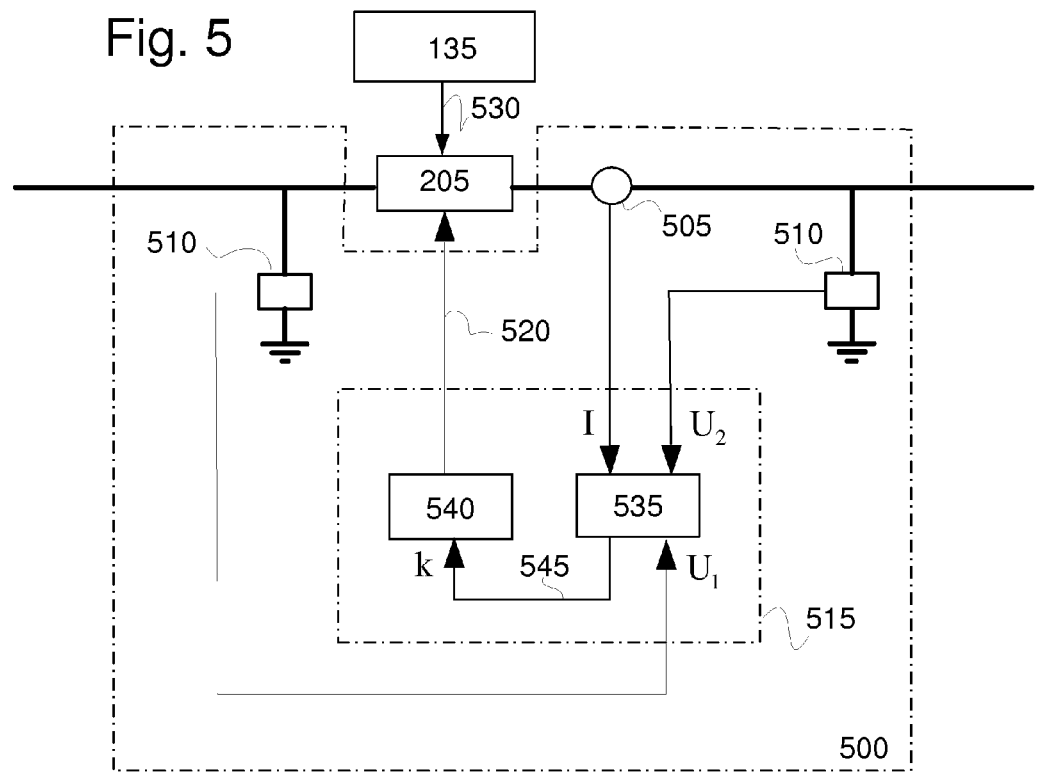
FIG. 5 illustrates an example of control system arranged to control the current limiting strength of a current limiter, where the control system comprises a limitation-determination system.

FIG. 5 provides an illustration of an example of a control system 500 for controlling a current limiter 205 which defines a border to a zone 200. The control system 500 comprises a current measurement device 505 arranged to measure the current through the current limiter 205 and to generate a signal I indicative of the measured current. The control system 500 further comprises a voltage measurement device 510 arranged on each side of the current limiter 205, arranged to measure the voltage on each side of the current limiter 205 and to generate a signal $U_1$ and $U_2$, respectively, indicative of the voltage on a first and second side of the current limiter, respectively. The current measurement device 505 could for example be an optical current transducer (OCT) or a DC current feedback compensation transducer (DCCT), or any other suitable current transducer or sensor. The voltage measurement devices 510 could for example be direct voltage divider, or any other suitable voltage measurement device. As will be seen below, the voltage measurement devices and the inputs for receiving the signals $U_1$ and $U_2$, respectively, could be omitted in some embodiments of the control system 500.

The control system 500 further comprises a limitation-determination system 515, arranged to receive signals I, $U_1$ & $U_2$ and to generate a control signal 520 to be delivered to the current limiter 205, the control signal 520 being indicative of the number of breaker sections 300 to be opened/closed. Thus, the input of the limitation-determination system 515 of FIG. 5 is connected to the respective outputs of the current measurement device 505 and the voltage control devices 510, while the output of the limitation-determination system 515 is connected to a control input of the current limiter 205.

The connections for transmitting the signals I, $U_1$, $U_2$, 520 and 530 are typically wired connections in order to obtain sufficient speed and reliability, although wireless connections could also be contemplated.

The limitation-determination system 515 of FIG. 5 is shown to include a limitation strength determination mechanism 535 and a control signal generator 540. The limitation strength determination mechanism 535 is arranged to determine whether the present limitation strength of the current limiter 205 should be increased or decreased. For the control of a current limiter 205 having a set of series connected breaker sections 300 as shown in FIGS. 3a and 3b, the limitation strength determination mechanism 535 is arranged to determine whether the number k of open breaker sections 300 should be increased or decreased. The limitation strength determination mechanism 535 is furthermore arranged to deliver, to the control signal generator 540, a signal 545, indicative of the currently required limitation strength (or, alternatively, of a variation in the required limitation strength). When the current limiter 205 is a current limiter having n independently controllable breaker sections 300, the signal 545 will be indicative of the number k of breaker sections that should be open (or, alternatively, of variations in the number k).

The control signal generator 540 is arranged to generate a control signal 520 in response to a signal 545 indicative of a change in the desired number k of open breaker sections 300. In case of the current limiter 205 being breaker-section based (cf. FIGS. 3a and 3b), the control signal generator 540 could furthermore be arranged to select which of the breaker sections 300 should be open or closed. The operation of the control signal generator 540 will be further discussed in relation to FIG. 9.

The current limiter 205 could advantageously be further connected to a protection system 135, as shown in FIG. 5. Protection system 135 is preferably independent of control system 500, and arranged to detect a fault 400b which would require that the current limiter 205 was opened, i.e. that the current limiter 205 broke the current. Such fault 400b could for example be a line fault along the zone-dividing line 115z in which the current limiter is connected, or a fault in the DC switchyard 120 to which the current limiter 205 is connected. Upon detection of such fault, protection system 135 would send a tripping signal 530, in response to which the current limiter 205 would break the current—in the current limiters 205 of FIGS. 3a and 3b, this would involve sending a tripping signal to the semiconducting switch 305 of each of the breaker sections 300 (or at least, in case of redundant breaker sections 300, to a sufficient number of breaker sections 300 to set up a sufficient voltage to break the current).

In a configuration wherein a zone-dividing HVDC line 115z is equipped with two HVDC breakers 130ii, in addition to the current limiter 205, no protection system 135 has to be connected to the current limiter 205 the protection system 135. Instead, both HVDC breakers 130ii could be connected to a protection system 135. In this configuration, the number of sections 300 of a section-based current-limiter 205 does not have to be sufficient to set up a voltage capable of breaking the current, but the number of sections could be designed for current-limitation scenarios only.

Although current limiters 205 of any suitable design could be used in the present invention, it will hereinafter be assumed, for illustrative purposes, that current limiters 205 based on independently controllable breaker sections 300 are used.

Figure 6A:
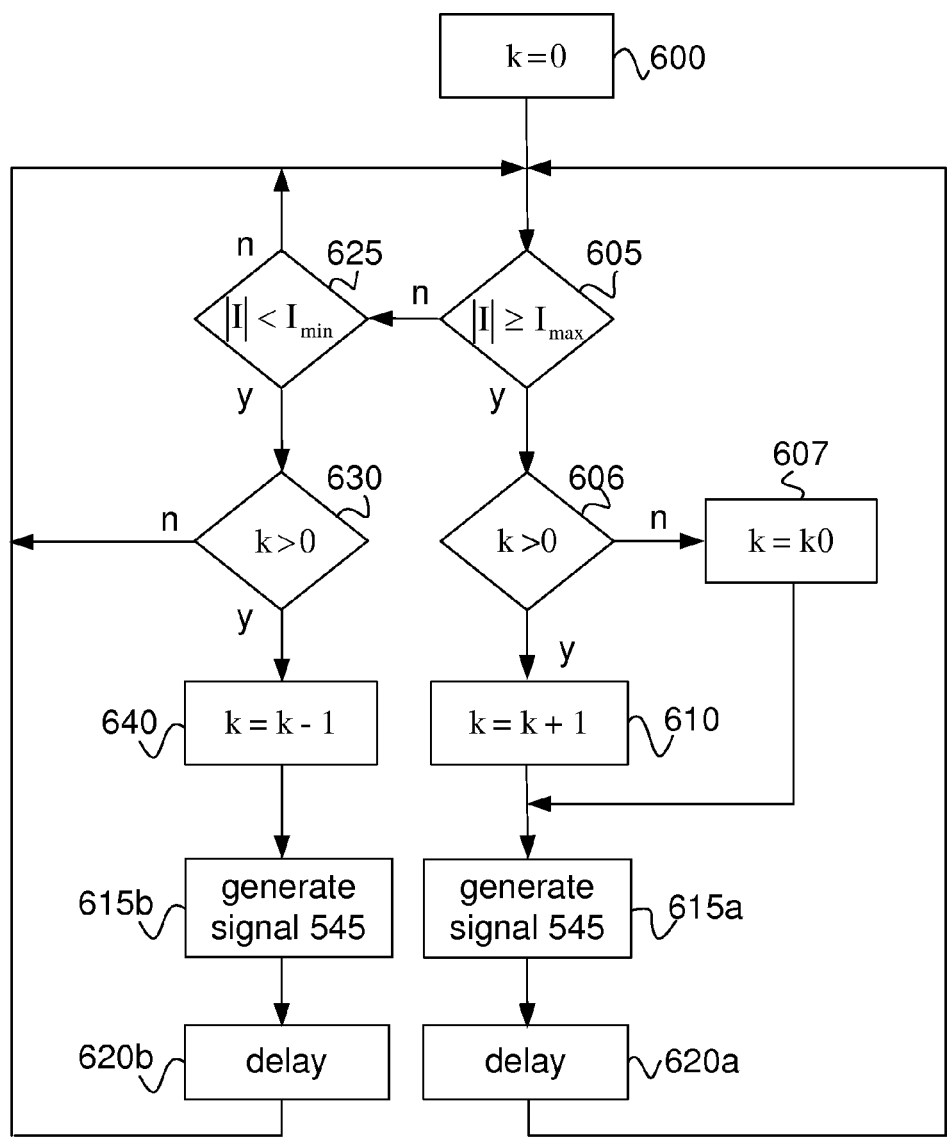
FIG. 6a is a flowchart illustrating an embodiment of a method of determining the required current-limiting strength of a current limiter for the case when the regulation range lies above the rated current of the transmission.

The operation of different embodiments of the limitation strength determination mechanism 535 will now be discussed. The limitation strength of the current limiter 205, which is here determined by the number k of open breaker sections 300, can for example be controlled in dependence on measurement of the present current I through the current limiter 205, i.e. in dependence on a value conveyed to the limiting strength determination mechanism 535 by the signal I. An example of a determination process is illustrated in FIG. 6a, wherein the number k of open breaker sections 300 is controlled to regulate the current I through the current limiter 205 to lie within a regulation range: $I_{min} < |I| < I_{max}$. The regulation range represents a desired current range in case of a fault—in case of a detected fault, if the current lies above $I_{max}$, at least one breaker section 300 is opened (unless all are already open); and if a the current lies below $I_{min}$, at least one breaker section 300 is closed (if any are open).

At step 600 of FIG. 6a, the process is initiated in that the parameter k, indicating the number of breaker sections 300 that should be open, is set to zero. Typically, this step is first entered when the current limiter 205 is initiated for normal operation. In step 605, it is then checked whether the present current I exceeds the current threshold representing maximum current level of the regulation range, $I_{max}$. If so, step 606 is entered, wherein it is checked whether the number of open breaker sections 300, represented by the number k, exceeds zero. If not, i.e. if no breaker sections 300 are open, the k is set to a predetermined number k0, which can for example be chosen such that the voltage across the k0 non-linear resistors 310 will approximately correspond to the nominal voltage or the rated voltage. Hence, if no breaker sections 310 are switched in upon entry into step 605, a predetermined number k0 will be switched in step 607. Step 615a is then entered, wherein a signal 545 indicative of k is generated and sent to the control signal generator 540. Step 620a is then entered, wherein a delay is introduced in order to let the current level adjust to the new voltage situation. After the delay step 620a, step 605 is re-entered.

If in step 606 it is found, on the other hand that k already exceeds zero, then step 610 is entered, wherein the number k, representing the desired number of open breaker sections 300, is incremented by one. Step 615a is then entered.

If in step 605 it is instead found that the present current level I lies below $I_{max}$, then step 625 is entered, where it is checked whether I is below the current threshold representing the minimum current of the regulation range, $I_{min}$. If not, no action is required and step 605 is re-entered. However, if the present current level I is found to lie below $I_{min}$, then step 630 is entered, wherein it is checked whether k has a value larger than 0. If not, the limitation strength of the current limiter 205 cannot be reduced further, and step 605 is therefore re-entered. However, if k>0, indicating that at least one breaker section 300 is open, then step 640 is entered, wherein the value of k is reduced by one. Step 615b is then entered, wherein a signal 545 indicative of k is generated and sent to the control signal generator 540, prior to entering the delay step 620b. After step 620b, step 605 is re-entered.

Once a fault in a first zone 200 has been disconnected by the HVDC breakers 130 on either side of the fault, the DC voltages in this first zone 200 will start to increase and the fault-current contribution from surrounding zones 200 will tend to go below the lower threshold $I_{min}$, at which time the open breaker sections 300 will start to close to maintain the current within the two thresholds. Once all sections are closed, normal operation is resumed also in the first zone 200.

The regulation range $[I_{min}, I_{max}]$ could be set to lie entirely above the rated current of the transmission, $I_{rated}$; the regulation range could be set to lie entirely below the rated current, $I_{rated}$; or the regulation range could be set so that $I_{rated}$ falls within the regulation range. The rated current of the transmission, $I_{rated}$, is here typically the rated current of the zone-dividing HVDC line 115z to which the current limiter 205 is connected, depending on the dimensioning of the components of the DC grid 100.

In the current regulation process illustrated in FIG. 6a, the present level of the current I is the determining factor for whether or not the limitation strength of the current limiter 205 should be altered. If I lies below the minimum current of the regulation range and there are no open breaker sections 300, then no further action will be taken to amend the current. In other words, if the current level is at or below the rated current, the current limiter 205 will not act to amend the current level when the regulation range lies above the rated current. Hence, if a fault has occurred and later been cleared, the process in FIG. 6a would operate to return the present current level to the current level during normal operation. Thus, the current regulation process of FIG. 6a is suitable if the rated current $I_{rated}$ lies below the regulation range. As can be seen in FIG. 6a, no information on the voltage on either side of the current limiter 205 is required, and thus, when the regulation range lies entirely above the rated current, the voltage measurement devices 610 could be omitted from the control system 500. However, if desired, voltage measurements as well as current measurements could be used to detect a fault situation.

However, when the rated current lies above the regulation range, the situation is different, and the fact that the current has exceeded the maximum current of the regulation range is not an appropriate indication that the current limiter 205 should be activated. The method illustrated in FIG. 6a would in this situation regulate the current to lie below the rated current (within the regulation range), upon occurrence of a fault, as well as during normal operation before any fault 400 has occurred & after a fault has been cleared. In order to avoid such undesired suppression of the current during normal operation, an additional condition could be included in the method of FIG. 6a. Such additional condition could for example be based on the voltage level on one or both sides of the current limiter 205, depending on whether the current limiter is uni-directional or bidirectional.

Figure 6B:
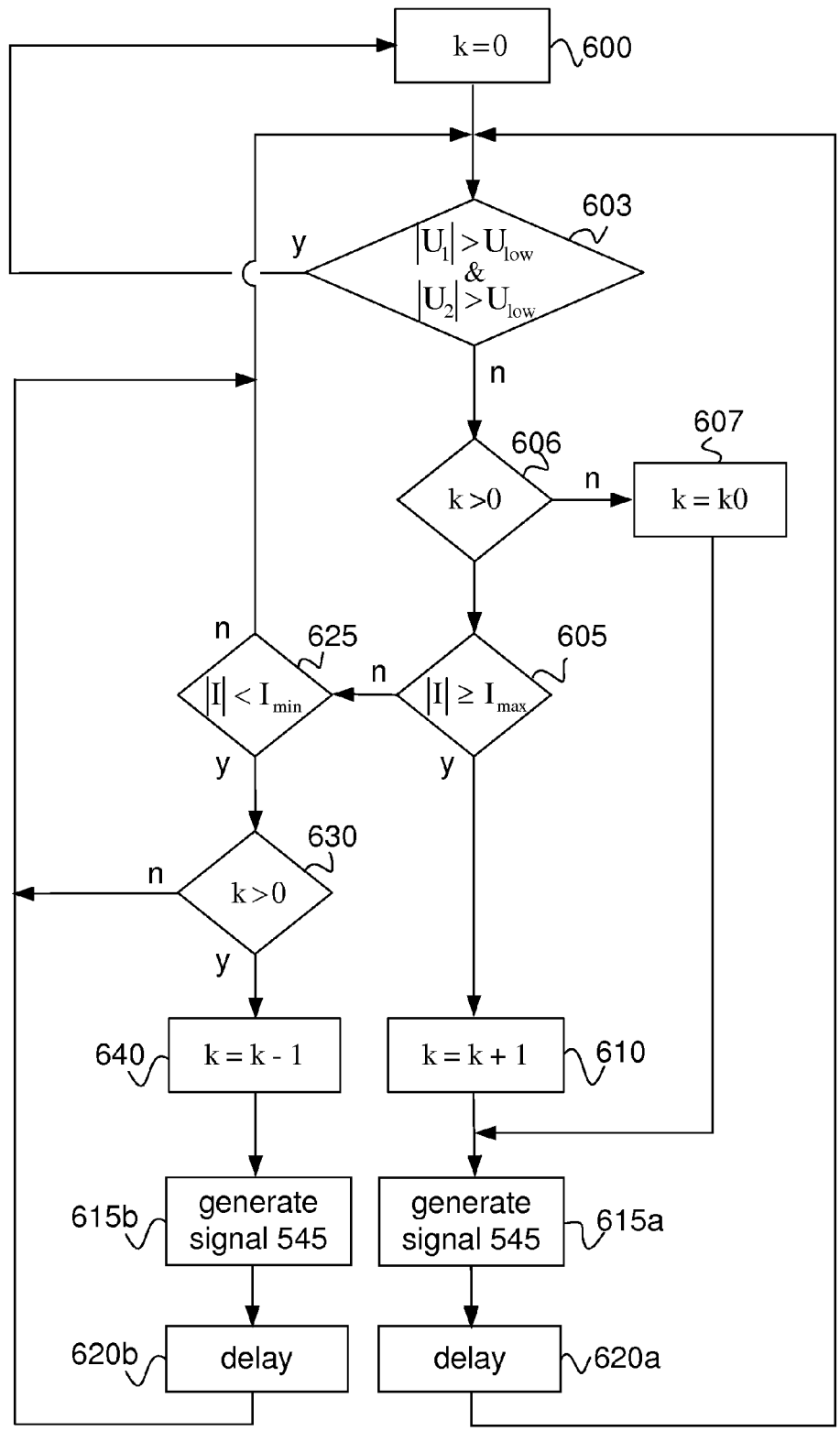
FIG. 6b is a flowchart illustrating an embodiment of a method of determining the required current-limiting strength of a current limiter for the case when the maximum current of the regulation range lies above or below the rated current of the transmission.

An embodiment of the regulation process discussed in relation to FIG. 6a, to which a check of such additional condition has been added, is shown in FIG. 6b. The embodiment of FIG. 6b comprises step 603, which is entered after step 600, prior to entering step 605. In step 603, it is checked whether both the voltage $U_1$ on a first side of the current limiter and the voltage $U_2$ on the second side of the current limiter 205 exceed a lower voltage level $U_{low}$. If so, it is concluded that no fault has occurred in any of the zones 200 that the current limiter 205 is interconnecting, and step 600 will be re-entered. However, if it is found in step 603 that the voltage level on either side of the current limiter 205 (or both sides) has fallen below the lower voltage level $U_{low}$, this is an indication that a fault has occurred and that the current limiter 205 should be activated. Step 606 is then entered. $U_{low}$ could for example lie within the range $0.1 U_{rated} < U_{low} < 0.8 U_{rated}$. In step 606, it is checked whether k exceeds zero. If not, i.e. if no breaker sections 300 are open, then k is set to a predetermined number k0, which can for example be chosen such that the voltage across the k0 non-linear resistors 310 will approximately correspond to the rated voltage. Step 615a is then entered, wherein a signal 545 indicative of k is generated and sent to the control signal generator 540. Step 620a is then entered, wherein a delay is introduced in order to let the current level adjust to the new voltage situation. After the delay step 620a, step 603 is re-entered.

If it is found in step 606, on the other hand that k already exceeds zero, then step 605 is entered, wherein the number k, representing the desired number of open breaker sections 300, is incremented by one. Step 615a is then entered.

Once step 605 has been entered, the procedure is similar to the procedure of FIG. 6a. However, rather than re-entering step 605 after the delay in step 620a/620b, or after a negative conclusion in step 625 or 630, step 603 is re-entered to ensure that the fault is still present. Thus, in the fault-current-strength determination method of FIG. 6b, the voltage level at the current limiter 205 is used as an indicator of a fault situation, while in the method of FIG. 6a, the current level through the current limiter 205 is used as such indicator. As can be seen, in an embodiment wherein the desired fault-current range lies below the rated current, measurements of the voltages $U_1$ and $U_2$ on the respective sides of the current limiter 205 are useful.

If it is concluded in step 603 that the voltage on both sides exceeds $U_{low}$, this indicating that the fault has been cleared, the limitation-strength indicator k is set to zero in step 600. Thus, the current limiter 205 is deactivated. In an alternative implementation, the limitation-strength indicator k will be gradually be reduced to zero after a finding in step 603 that the voltage exceeds $U_{low}$.

The regulation method of FIG. 6b is suitable also when the regulation range includes the rated current of the transmission, $I_{rated}$. By introducing the condition of step 603, it is ensured that the current limiter 205 will be inactive during normal operation. If desired, the regulation method of FIG. 6b could be used also when the regulation range lies below the rated current $I_{rated}$. As will be discussed in relation to FIG. 9, the regulation range could include the extreme case where the current is limited to zero.

In the regulation methods illustrated in FIGS. 6a and 6b, the magnitude of the current and/or voltage is used as a basis for determining whether a fault has occurred, and thus whether or not to limit the current. The direction (sign) of the current, on the other hand, can advantageously be used in order to determine in which direction a closed breaker section 300 should be blocked.

To regulate the fault current through a zone-dividing current limiter 205 so that it falls within a regulation range above the rated current level has the advantage of providing a higher charge of the cables and/or overhead-lines forming the HVDC lines 115 in the faulty zone 200 once the fault has been cleared. To regulate the fault current through a zone-dividing current limiter 205 so that it falls within a regulation range below the rated current level, on the other hand, results in a lower power loss in the current limiter(s) 205, thus allowing for a less heat-resistance design of the current limiter(s) 205 (e.g. a simpler design of the non-linear resistors 310 of the current limiters 205 shown in FIGS. 3a and 3b) and/or for a longer period of time during which a current limiter 205 can carry a current (thus facilitating for the use of slower HVDC breakers 130). A lower fault-current level also yields a lower requirement on current-breaking capacity of the HVDC breakers 130. Moreover, the power lost in the current limiter 205 will be provided by the healthy zones 200 surrounding the faulty zone 200. Thus, a lower power loss in the current limiter 205 may yield a more stable operation of the healthy zones 200 during the fault-on period. If the regulation range includes the rated current, $I_{rated}$, the advantage of a higher charge of the HVDC lines once the fault is cleared, as well as the advantages of a lower power-loss and lower fault current, will be present but less pronounced. Depending on which of the above advantages is/are most desired, the regulation range could be selected to lie above or below the rated line current, or to include the rated current, $I_{rated}$.

The processes illustrated by FIGS. 6a and 6b are examples only and could be varied in different ways. For example, the increment of k made in step 610 could differ from one, and could for example depend on the difference between $I_{max}$ and the present value of I—if the difference is large, then k could be incremented by a higher number of steps than if the difference is small. Similarly, the decrease of k in step 640 could be larger than one, and could e.g. be made dependent on the difference between $I_{min}$ and the present value I. Moreover, the signal 545 could be indicative of the desired change in k, rather than of k itself. Furthermore, in another type of current limiter 205, step 610 (640) could represent another means of increasing (decreasing) the limitation strength of the current limiter 205. The parameter k in FIG. 6a is used to represent the number of open breaker sections 300. However, in the general case, the number k represents a measure of the present limitation strength of the current limiter 205, and can be referred to as a limitation-strength indicator. The signal 545 could be referred to as a limitation-strength signal 545.

Step 606 and 607 of FIGS. 6a and 6b serve to give the current limitation a kick start, by opening a pre-determined number of breaker sections. In another implementation, k can for example be given a value in step 607 which depends on the time derivative of the current and/or voltage. In yet another implementation, steps 606 and 607 could be omitted, and the current-limiting strength could be determined in steps 610 and 640 only.

The delay steps 620a and 620b could be implemented as identical steps. However, depending on the inductance of the DC grid 100, it could be beneficial to use different durations of the delay in the cases of incrementing (620a) and decrementing (620b) the limitation strength indicator k. It might for example be beneficial to have a shorter delay when the current lies above $I_{max}$, so as to ensure that a fault current does not rise at an undesired rate, whereas when the current is decreased, it might be beneficial to use a longer delay period, so that the current can stabilize and unnecessary switching in-and-out of the current limitation strength. Hence, in one embodiment, the duration of the delay is shorter in step 620a than in step 620b. As a non-limiting example, the duration of the delay in steps 620a and 620b could lie within the range of 50 μs-10 ms. However, other durations of the delay could be used.

Figure 7:
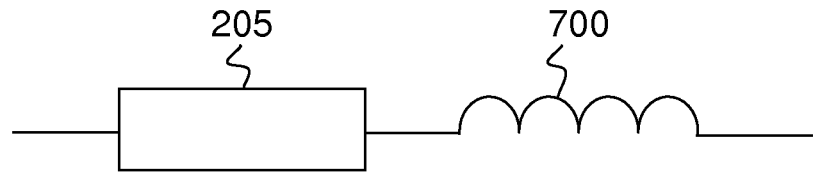
FIG. 7 is an example of a configuration wherein a current limiter is connected in series with a reactor to reduce the time derivative of the current upon regulation of the current-limiting strength.

In one implementation of the invention, a reactor 700 is connected in series with the current limiters 205, as shown in FIG. 7. By connecting a reactor 700 in series with the current limiter 205, the time derivative of the current will be reduced. This could for example be beneficial in a scenario where a fault has occurred in a location such that the inductance of the fault-current path is low, and where none of the available values of k will keep the fault current within the regulation range. A reactor 700 in series with the current limiter 205 could in this scenario prevent a high frequency of switching between different values of k. Since the switching of semi-conducting switches 305 typically generates heat, it might for cooling purposes be desirable to keep the switching frequency low. The inductance of a reactor 700 could for example lie within the range from around ten to some hundred mH.

The different embodiments of the process performed by the limitation strength determination mechanism 535 shown in FIGS. 6a and 6b only relate to the operation of a main switch 317 of a current limiter 205. However, as discussed in relation to FIGS. 3a and 3b, it is often useful to use current limiters 205 further comprising a transfer switch 315. The process described by the embodiments in FIGS. 6a and 6b applies also to a current limiter 205 having a transfer switch 315, once the transfer switch 315 has been opened and the current has been commutated to the main switch 317.

Figure 8B:
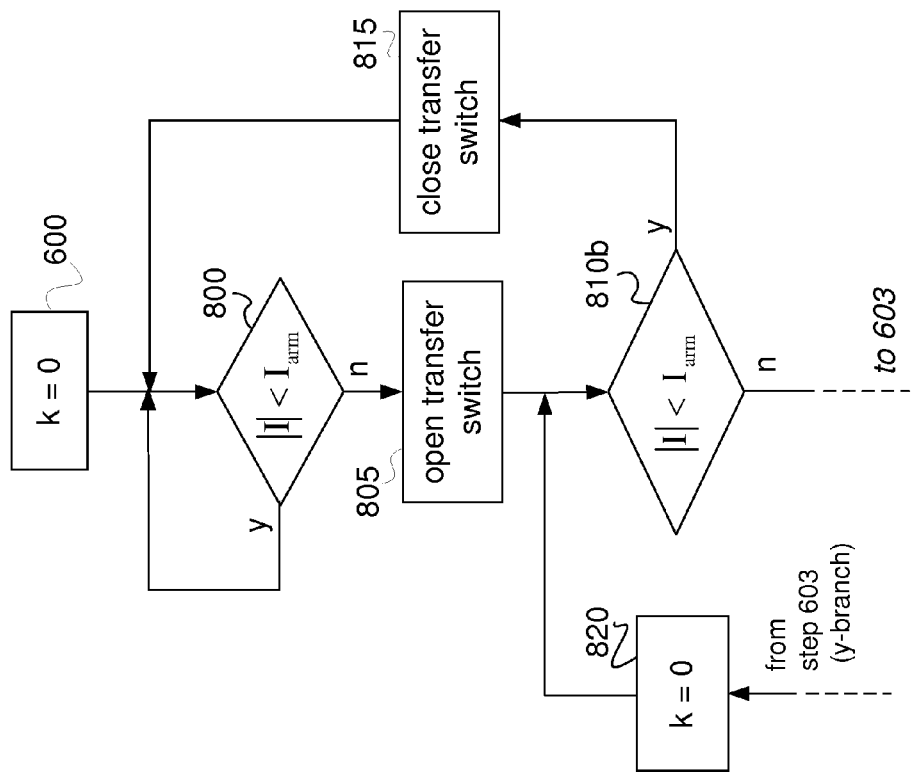
FIG. 8b shows a flowchart illustrating another example of a method of controlling a transfer switch.
Figure 8A:
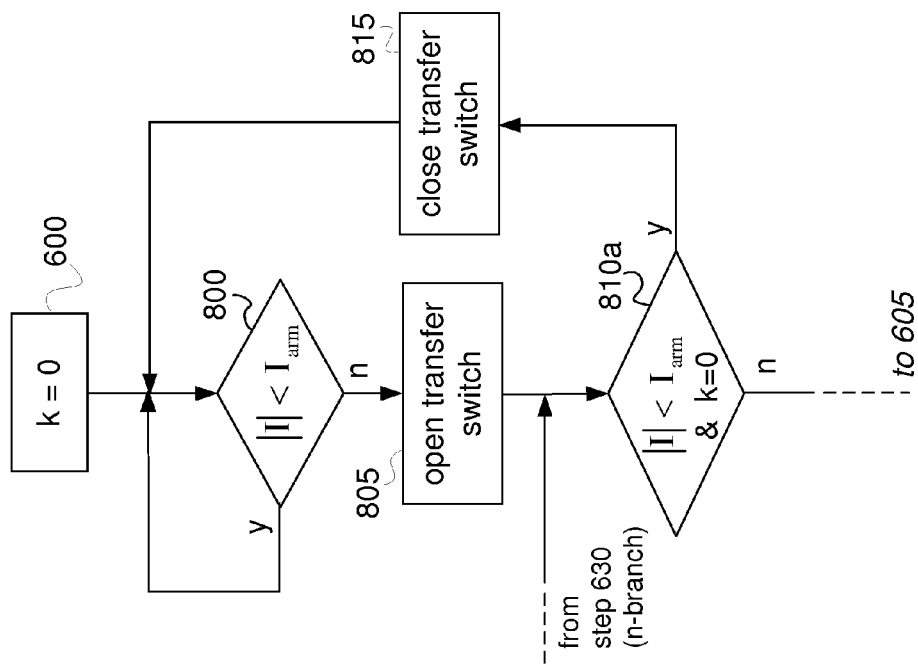
FIG. 8a is a flowchart illustrating an example of a method of controlling a transfer switch.

An embodiment of a process for opening the transfer switch 315 is illustrated in FIG. 8a. The process of FIG. 8a could advantageously be used together with the process shown in FIG. 6a for determining the limitation strength when the regulation range lies above the rated current of the transmission.

The process of FIG. 8a is based on the idea that the transfer switch 315 should be opened (corresponding to "arming" the current limiter 205) when a first indication of a fault is detected, where the first indication is received at an earlier stage than the fault detection of step 605. This fault indication is therefore generally less certain, but since opening the transfer switch 315 does not affect the operation of the DC grid 100 other in that the power consumption increases during a short period of time, an incorrect opening of the transfer switch is acceptable.

At step 600 of FIG. 8a, the parameter k is first set to zero, as discussed above in relation to FIG. 6a. Step 800 is then entered, wherein it is checked whether the present current level is below the arming current level, $I_{arm}$. If so, step 800 is re-entered. However, if the magnitude of the present current has risen above $I_{arm}$, step 805 is entered, wherein the transfer switch 315 is opened. In step 810a, it is checked whether the present current is below $I_{arm}$ and the limitation-strength indicator k takes the value zero. If so, the transfer switch 315 is closed, and step 800 is re-entered. If not, the main switch activation decision step is entered (cf. step 605 of FIG. 6a), wherein the process of determining the appropriate limiting strength of the current limiter 205 is commenced.

Step 810a can be seen as superfluous when entered directly after step 805, and can then be omitted. However, step 810 can advantageously be entered also after having found, in step 630, that the limitation-strength indicator k is zero while the current lies below the minimum current in the regulation range. In this situation, the current-limiting functionality of the current limiter 205 is no longer active, and a check as to whether the transfer switch 315 should be closed could advantageously be made. In this situation, if the current still lies above $I_{arm}$, it would be advantageous to keep the transfer switch 315 in an open state, in order to quickly be able to limit the current again, if needed. However, if $I_{arm}$ lies above the minimum current of the regulation range, or if such precautionary maintaining of the transfer switch 315 is not desired, step 815 could be entered directly after having determined in step 830 that k has taken the value zero.

FIG. 8b illustrates an example of a process for opening of the transfer switch 315 which could for example be used together with the process shown in FIG. 6b for determining the limitation strength when the regulation range lies below or partly below the rated current of the transmission. The process of FIG. 8b is similar to that of FIG. 8a. After the limitation-strength indicator has been set to zero in step 600, step 800 is entered, wherein it is checked whether the current lies below the arming current, $I_{arm}$. If so, step 800 is re-entered. If the current level is larger than $I_{arm}$, the transfer switch is opened in step 805. Step 810b is then entered, wherein it is checked whether the current level lies below the arming current. If so, step 815 is entered, wherein the transfer switch is closed. Step 800 is then re-entered. However, if it is found in step 810b that the current lies above $I_{arm}$, the main switch activation decision step is entered (cf. step 603 of FIG. 6b), wherein the process of determining the appropriate limiting strength of the current limiter 205 is commenced.

Similar to FIG. 8a, step 810b could be omitted if entered directly after the transfer switch has been opened in step 805. However, step 810b could advantageously be entered also when it has been determined in step 603 that the voltage at both sides of the current limiter 205 lies above the lower voltage level $U_{low}$. In this situation, the current-limiting functionality of the current limiter 205 should be de-activated, and a check as to whether the transfer switch 315 should be closed could advantageously be made. A step 820 could be introduced, which is entered from the y-branch of step 603, prior to entering step 810b.

In step 820, the current-limiting strength indicator k is set to zero. Hence, by entering step 820 instead of step 600 after a positive decision in step 603, steps 800 and 805 does not have to be performed in a situation where the transfer switch 315 will definitely be open. In FIG. 8b, the step 810 differs from step 810*a* of FIG. 8*a* in that no check as to whether k is zero is performed, since k has been set to zero in step 820. However, a k-check could be made also in step 810*b*, if desired.

The procedures of FIGS. 8*a* and 8*b* are examples only, and could be altered in different ways. For example, in one implementation of FIG. 8*a*, the check of step 810*a* is omitted, and step 815 is entered directly after a negative decision in step 630. Similarly, the check of step 810*b* could be omitted in FIG. 8*b*, and step 815 could be entered directly after a positive decision in step 603—in this implementation, step 820 could either be included, or omitted.

In FIGS. 8*a* and 8*b*, the first indication of a fault is represented by the present current level, I, raising above an arming current level, $I_{arm}$. $I_{arm}$ could e.g. in the range $I_{rated} < I_{arm} < I_{rated}$. An alternative representation of the first indication of a fault could be that the voltage at either side of the current limiter 205 falls below an arming voltage level, $U_{arm}$. $U_{arm}$ could for example lie in the range $0.5\, U_{rated} < U_{arm} < 0.8\, U_{rated}$.

If desired, a different threshold could be used for closing the transfer switch 315 than for opening the transfer switch 315, so that the threshold of step 810*a*/810*b* is higher than that of step 800 when the current is used as a first indication of a fault, or lower than that of step 805 when the voltage is used as a first indication of a fault.

Figure 9:
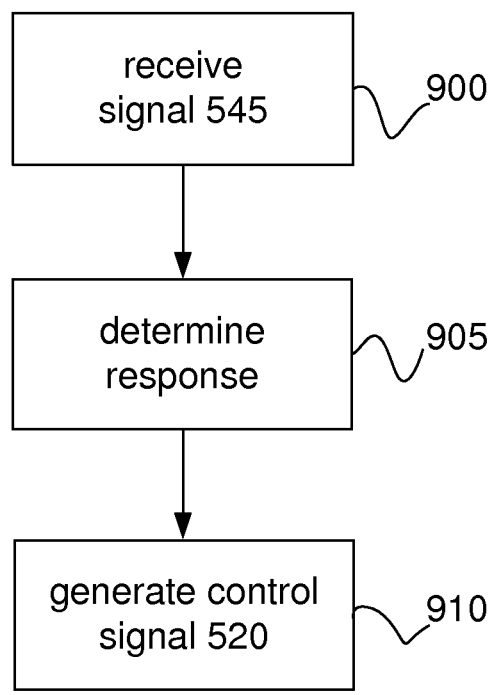
FIG. 9 shows a flowchart illustrating an embodiment of a process for generating control signals to send to a current limiter once the required limiting strength has been determined.

An embodiment of a process performed by control signal generator 540 is schematically illustrated in the flowchart of FIG. 9. At step 900, a limitation-strength signal 545 is received from the limitation strength determination mechanism 535. At step 905, the required action is determined in dependence on the limitation-strength signal (other information may also be used in the determining process). When the current limiter 205 is based on a series-connection of breaker section 300, step 300 involves determining the number of breaker sections 300 that should be open. The determination typically also includes determining which breaker section(s) 300 that should be opened or closed. In step 910, a control signal 520 is then generated at the output of the limitation-determination system 515, to which the current limiter 205 is connected. When the current limiter 205 comprises semiconducting switches 305, such control signal 520 could for example comprise a combination of firing and/or blocking signals (depending on whether breaker sections 300 should be switched in or out) in a conventional manner.

The determination of step 905 could for example be based on a predetermined scheme for opening/closing the breaker sections 300. Such pre-determined scheme could for example operate to open (close), when the current-limiting strength is to be increased (decreased), the semi-conductor switch 305 of the breaker section 300 that has been closed (open) the longest of the closed (open) breaker sections 300. In such embodiment, the control signal generator 540 could for example include a memory for storing information on at what moments the different breaker sections 300 were last switched in or out. Other predetermined schemes could alternatively be used.

Alternatively, in a breaker section based current limiter, the control signal generator 540 could in step 905 determine which breaker sections 300 to open or close based on an estimation of the temperature of, or the amount of energy absorbed in, the different non-linear resistors 310, so that the open breaker sections 300 will be selected from the breaker sections 300 having the lowest temperature, or, correspondingly, the highest energy-absorbing capacity. The highest temperate that is safe, or the maximum energy that can safely be absorbed by a non-linear resistor 310 during a fault-on period is typically known (the effects of cooling can typically be neglected during the fault-on period). The present energy-absorbing capacity of different non-linear resistors 310 could then for example be estimated by calculations of the absorbed energy in the non-linear resistors 310, or by means of measurements performed by a temperature sensor which would be arranged to deliver a temperature signal to the control signal generator 540. For example, the following expression could be used for the estimation of the energy absorbed in a non-linear resistor 310:

$$E_{310,i}(t) = \int_{t_{start}}^{t} I(t) \cdot U_{310,i}(I) \cdot \alpha_i(t)\, dt \quad (1a),$$

where $E_{310,i}(t)$ is the energy absorbed by the $i^{th}$ non-linear resistor 310 at time t since the occurrence of the fault at time $t_{start}$; I(t) is the current through the current-limiting breaker 205, which is measured by the current measuring device 505 and known to the current limiting system 515; $U_{310,i}(I)$ is the known U-I-characteristic of a non-linear resistor 310; and $\alpha_i(t)$ is a function which takes the value 0 when the semiconducting switch 305 of the $i^{th}$ breaker section is closed, and the value 1 when the semi-conducting switch 305 of the $i^{th}$ breaker section 300 is open. Expression (1a) could be refined, if desired, to for example include effects of cooling. However, during a fault-on period, effects of cooling can generally be neglected, since time constants for cooling are typically much longer than the fault on period. Furthermore, an estimation of the absorbed energy $E_{310,i}(t)$ based on an assumption that the voltage $U_{310,i}$ across a non-linear resistor is constant will in most applications give an estimation of sufficient accuracy:

$$E_{310,i}(t) = \int_{t_{start}}^{t} I(t) \cdot U_{310,i} \cdot \alpha_i(t)\, dt \quad (1b).$$

When expression (1) is used for determining which breaker sections 300 to open or close, the breaker section 300 to be opened when k is increased could for example be the breaker section 300 having the lowest $E_{310,i}(t)$ of the currently closed breaker sections 300, and breaker section to close when k is decreased could for example be the breaker section 300 having the highest $E_{310,i}(t)$ of the currently open breaker sections 300.

Following fault clearing, the estimate of the energy absorbed in the non-linear resistors 310 should advantageously be adjusted to reflecting cooling, so that an accurate estimate of the absorbed energy is available should another fault occur. In one implementation, this is solved by only allowing re-closing the current limiter 205 after a cooling time period has elapsed since the current limiter 205 was activated, at which time the $E_{310,i}(t)$ is re-set to the initial value.

If an indication exists that the current limiter 205 may be damaged unless the current is actually broken rather than limited, the determination of step 905 could, when the current limiter 205 is a current limiting breaker, advantageously result in a decision to open enough (typically all) breaker sections 300, in order to break the current. Such damage-indication could for example be based on an estimation of absorbed energy in the non-linear resistors 310; on temperature measurements of the non-linear resistors 310; or on the time during which the non-linear resistors 310 have been switched in during the fault-on period. The procedure to asses when to trip the current limiter 205 due to excessive absorbed energy could for example be based on the breaker section 300 having the highest absorbed energy. Assuming that breaking the current completely would require all breaker sections 300, it should be ensured that the breaker section 300 with the highest absorbed energy can be switched-in a final time. Thus, in one embodiment, the current limiter 205 is tripped when the absorbed energy of a non-linear resistor 310 reaches an energy threshold, and no non-linear resistor 310 of another breaker section 300 could be switched in to take its place if switched out. The energy threshold could be set with a margin to the energy level at which the non-linear resistor 310 will be damaged. In opening all breaker sections 310, the fault-current contribution to the faulty zone 200 from the non-faulty zone 200, to which the current limiter 205 is connected, will be extinguished.

If a current limiter 205 has been tripped in order to protect the non-linear resistors from thermal damage, the control system 500 could, in one embodiment, continue to monitor the voltages $U_1$ and $U_2$ at the current limiter 205 (or, only $U_1$ or $U_2$, in case of uni-directional limiter). In this embodiment, a process such as the one shown in of FIG. 6b could be entered upon such self-protective tripping of the current limiter 205, with a minimum current of the regulation range, $I_{min}$, set to zero. This would particularly be useful if the faulty zone 200 is connected to another current source, for example an HVDC converter 105 or another zone-dividing HVDC line 115z, the current supply of which has not been cut off. When the fault is cleared, the voltage which was depressed during the fault-on period will then start to rise, providing an indication to the current limiter 200 that the fault has been cleared.

The estimation of absorbed energy used to obtain a damage-indication could e.g. be made in accordance with expression (1a) or (1b). However, in order to ensure that the current can actually be broken in case a fault occurs when another fault has recently been cleared, cooling of the non-linear resistors 310 should advantageously be taken into account. This could for example be solved by only allow re-closing the current limiter 205 after a cooling time period has elapsed since the current limiter 205 was activated, such that a re-opening of the current limiter 205 can be performed without damaging the non-linear resistors. The time constant for cooling could, in one implementation, be in the order of an hour. Alternatively, the expression used for estimation of absorbed energy could be refined to include the effects of cooling. A self-protective control system which is arranged to generate a damage indication and, if required, a self-protective tripping signal, could for example be implemented as part of control system 500, or as part of an independent protection system 135. In an embodiment wherein the current limiter 205 is not capable of breaking the current, such damage indication could be used to trigger the tripping of an HVDC breaker 130 protecting the current limiter 205.

In order to ensure that the current limiter 205 would not be damaged in the unusual event of the current limiter not being capable of tripping when the self-protection system gives a tripping instruction, a redundant current limiter 205 could be provided, or, when the current limiter 205 is based on a series-connection of breaker sections 300, redundant breaker sections 300 could be provided in the current limiter 205. Alternatively, the HVDC line 115z could be short-circuited so that the current limiter 205 is bypassed, thus leaving the clearing of the fault to HVDC breakers 130 or current limiters 205 in another zone 200.

Figure 10:
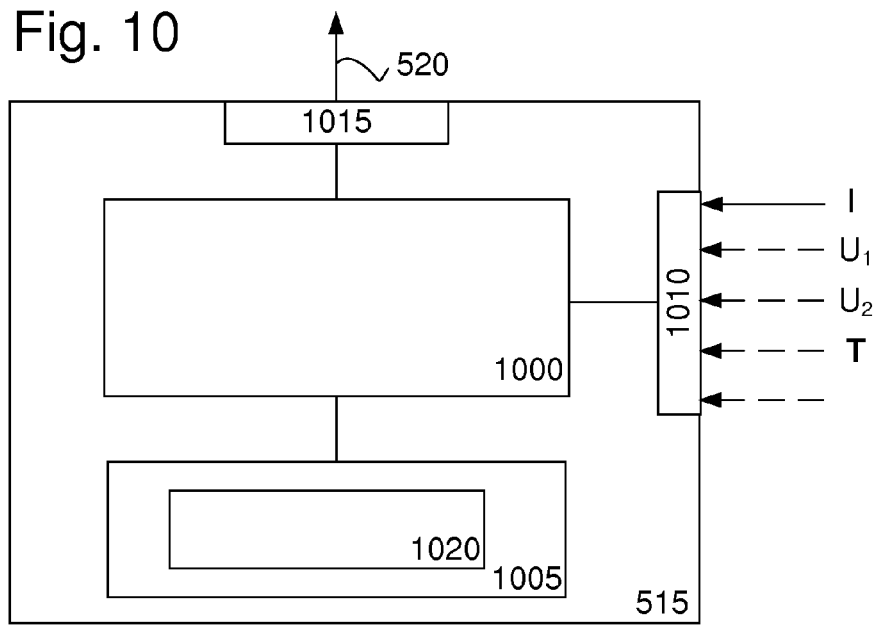
FIG. 10 schematically shows an alternative illustration of a limitation-determination system shown in FIG. 5.

In FIG. 10, an alternative way of schematically illustrating the limitation-determination system 515 of FIG. 5 is shown, wherein the limitation-determination system 515 is implemented by using a combination of hardware and software. FIG. 10 shows the limitation-determination system 515 comprising processing means 1000 connected to a computer program product 1005 in the form of a memory, as well as to interfaces 1010 and 1015. Interface 1010 is arranged to receive input signals comprising information relevant to the limitation strength determination. Such signals include signal I indicative of the present level of the current, and could e.g. also include signals $U_1$ or $U_2$ (or both, as appropriate) and signals indicative of the temperatures of the non-linear resistors 310, as discussed above. Interface 1015 is arranged to deliver the control signal 520.

The memory 1005 stores computer readable code means in the form of a computer program 1020, which, when executed by the processing means 1000, causes the limitation-determination system 515 to perform a current-limiting control method. Different embodiments of such method are illustrated in FIGS. 6a-b, FIG. 8 and FIG. 9. In other words, the limitation-determination system 515 would in this embodiment be implemented by means of one or more general purpose processors or one or more processors especially developed for the limitation-determination system 515, in combination with software 1020 for performing current limiting control. In FIG. 10, the software 1020 is shown to be stored on one physical memory 1005, however, software 1020 could be divided onto more than one physical memory 1005. A memory 1005 could be any type of non-volatile computer readable means, such as a hard drive, a flash memory, an EEPROM (electrically erasable programmable read-only memory) a DVD disc, a CD disc, a USB memory, etc.

Figure 11A:
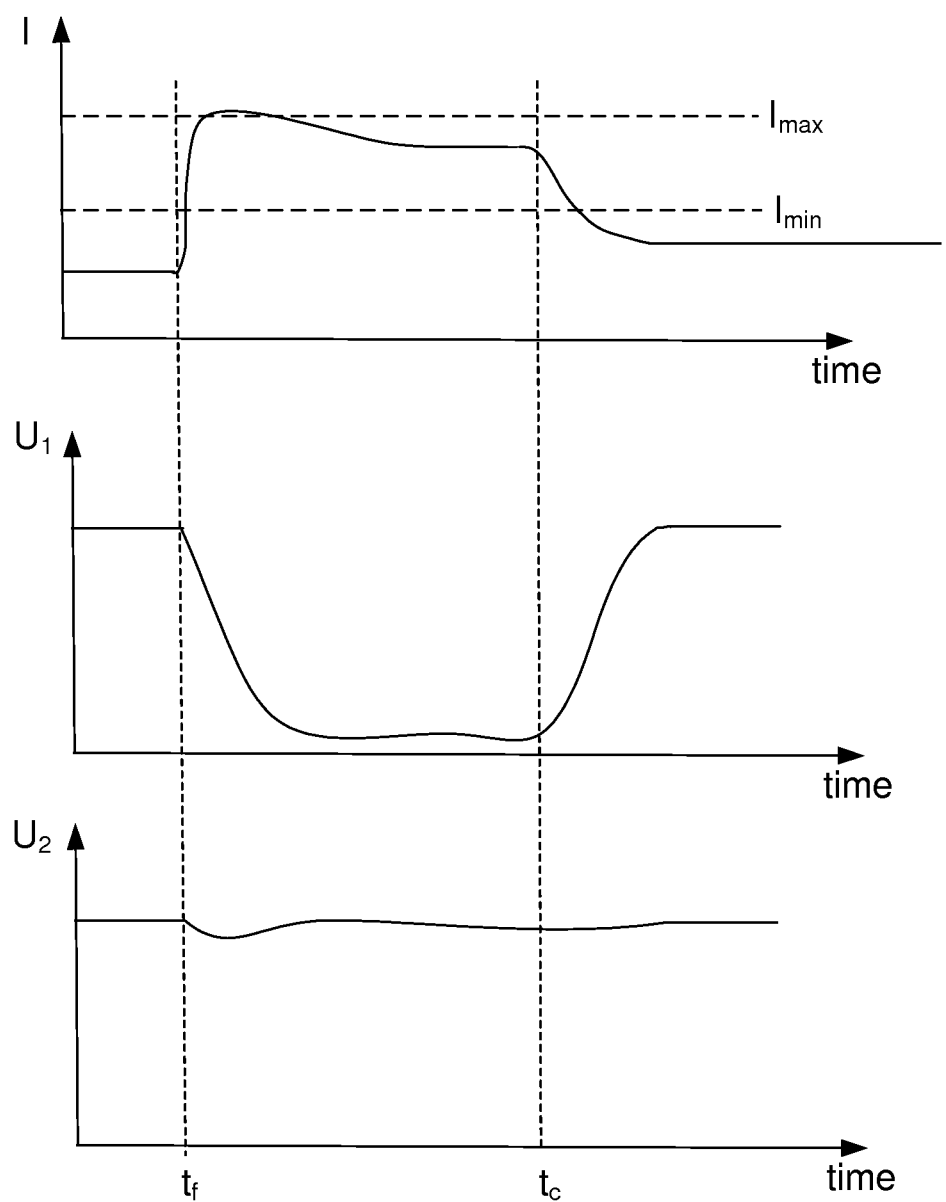
Figure 11B:
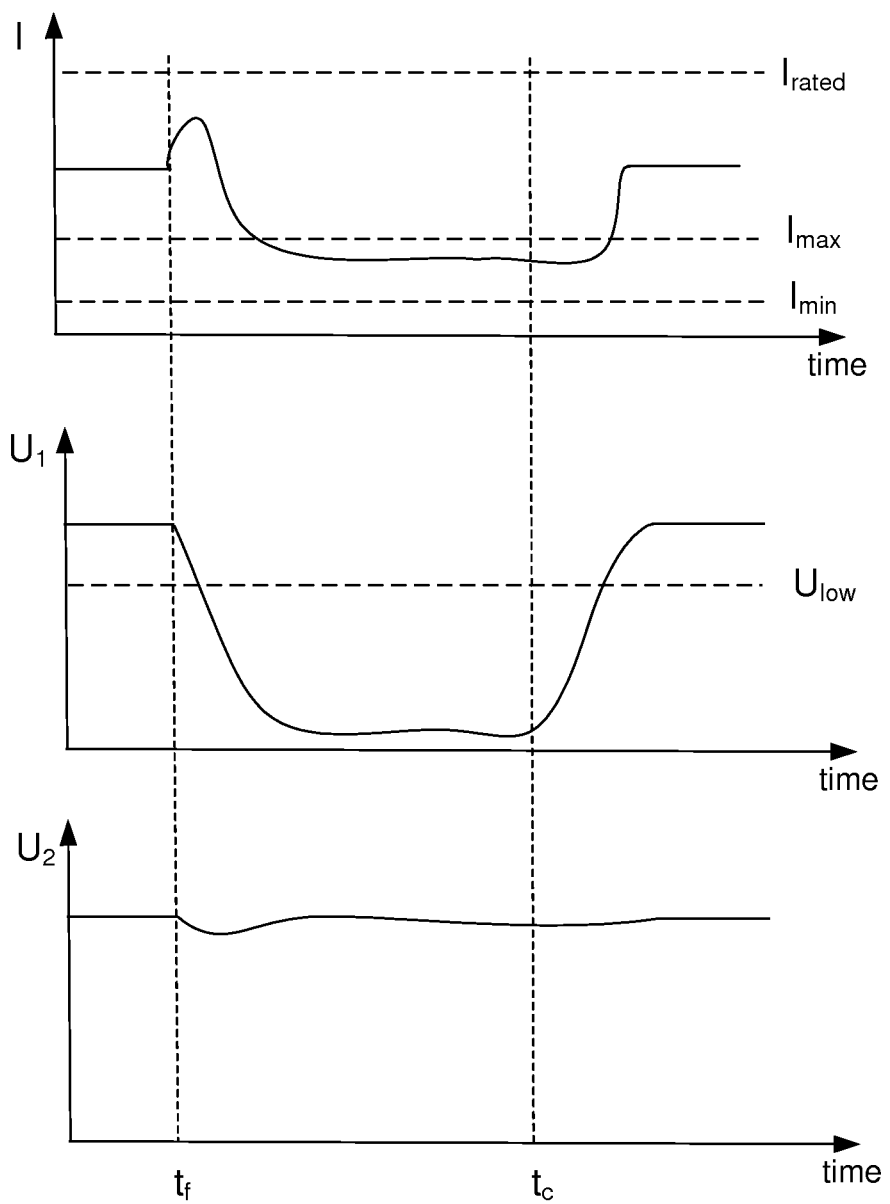
Figure 11C:
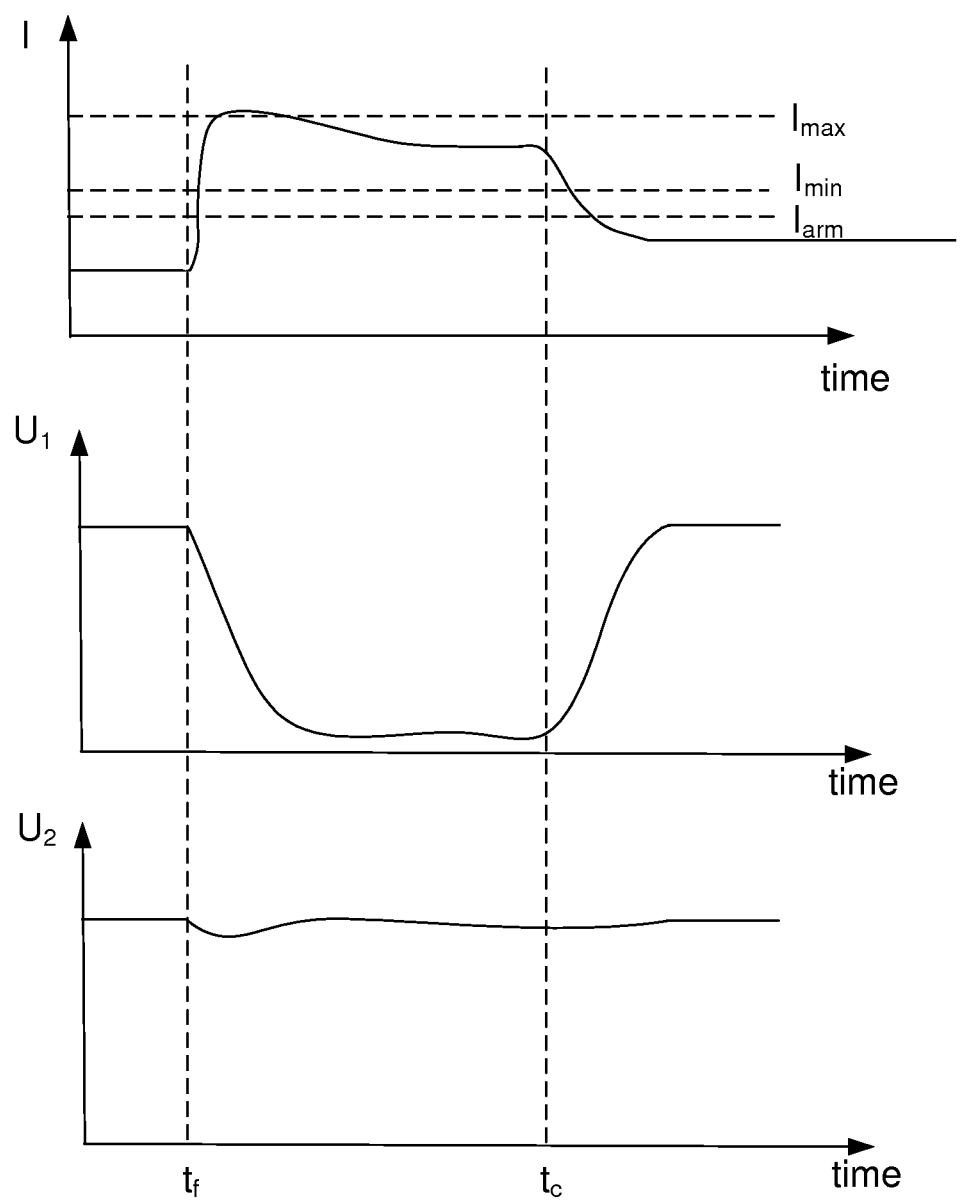

FIGS. 11a-11d illustrate the sequence of events according to some embodiments described above, in a situation where a line fault occurs in a first zone 200 at a time $t_f$ and where the fault is cleared at a time $t_c$. The current I through a zone-dividing current limiter 205 is plotted against time, as well as the voltage at the first-zone side of the current limiter 205 ($U_1$) and the voltage at the other side of the current limiter 205 ($U_2$). FIGS. 11a and 11b represent embodiments wherein the current limiter 205 does not have a transfer switch 315, while FIGS. 11c and 11d represent embodiments wherein a transfer switch 315 is present. Furthermore, FIGS. 11a and 11c represent embodiments wherein the rated current lies below the regulation range, while FIGS. 11b and 11d represent embodiments wherein the rated current lies above the regulation range. Worth noting is that the voltage at the neighbouring zone side, $U_2$, is essentially undisturbed, making it possible to continue organized power transfer in the neighbouring zone 200 also during the fault-on period.

In the above, the clearing of a fault has been described in terms of disconnecting a faulty object by means of HVDC breakers 130 (or by means of an HVDC breaker 130 and an AC breaker, if applicable) on either side of the faulty object, after which normal operation of the healthy part of the faulty zone 200 can be resumed. However, the invention also facilitates for a DC grid 100 having few or no HVDC breakers 130, in that, when a fault current is limited by the current limiter(s) 205 defining a zone 200 wherein a fault has occurred, the fault could be cleared by disconnecting a larger part of, or the entire, faulty zone 200. Hence, in a DC grid 100 which is divided into zones 200, the smallest part of the DC grid 100 which is disconnectable by means of HVDC breakers 130 could be larger, while still achieving limitation of the effects of a fault (to a zone 200 or part of a zone). In the extreme, the disconnection of a zone 200 could be effected by the AC breakers at the AC side of the HVDC converters 105 which are connected to the faulty zone 200. For example, if no HVDC breakers 130 were present in the DC grid shown in FIG. 4, the effects of the fault 400 could be limited by opening the AC breakers connecting the five HVDC converters in zone 200:1 to corresponding AC power systems when the fault current has been limited by the current limiters 205. Normal operation of zone 200:2 could then be maintained. If a zone 200 includes no HVDC breakers 130, the current limiter 205 should preferably break the fault current in case of a fault. In this configuration, the current limiter 205 could be replaced by a fast HVDC breaker with no possibility of independently control different breaker sections. Such fast HVDC breaker 130 could e.g. include a transfer switch 315 and a main switch, wherein the main switch comprises a semi-conductor switch 305 and a non-linear resistor 310 connected in parallel with the semi-conducting switch. Alternatively, the transfer switch 317 could be omitted.

The division of a DC grid 100 into zones 200 by means of current limiters 205 can be applied to both mono-polar and bipolar zone-dividing HVDC lines 115z. If zone-dividing HVDC line 115z consists of two pole lines, with positive and negative pole voltage, the line 115z will be equipped with two (preferably bi-directional) current-limiters 205, while for a single pole line, positive or negative pole voltage, with or without a metallic return line-dividing HVDC line 115z, a single (preferably bi-directional) current limiter 205 will typically be used on the single pole line. Other configurations can alternatively be used.

By the division of a DC grid 100 into different zones 200 as described above is achieved that a fault in a first zone 200 will not significantly affect the power transmission in the other zones 200 of the DC grid 100. Furthermore, the contribution to the fault current in a faulty zone 200 from the other zones 200 of the DC grid 100 will be limited, thus reducing the fault current level in the faulty zone 200. In order to further reduce the level of the fault current in a faulty zone, the connections 110 could also be provided with a current limitation mechanism. By providing the connections 110 with current limitation mechanism, the contribution to the fault current in a faulty zone 200 from the AC power system(s) to which the HVDC converter(s) 105, connected the faulty zone 200, is connected, will be limited. A current limitation mechanism could for example be provided to a connections 110 by connecting a current limiter in the connection 110, or by arranging the HVDC converter 105 so that it will be capable of limiting the current on the connection 110, for example in the manner described in N M MacLeod et al.: "The development of a Power Electronic Building Block for use in Voltage Source Converters for HVDC transmission applications", Cigré SC B4 2009 Bergen Colloquium, 2009, as well as in R Marquardt: "Modular Multilevel Converter: An universal concept for HVDC-Networks and extended DC-Bus-applications", IPEC 2010 conference, 2010.

Figure 12:
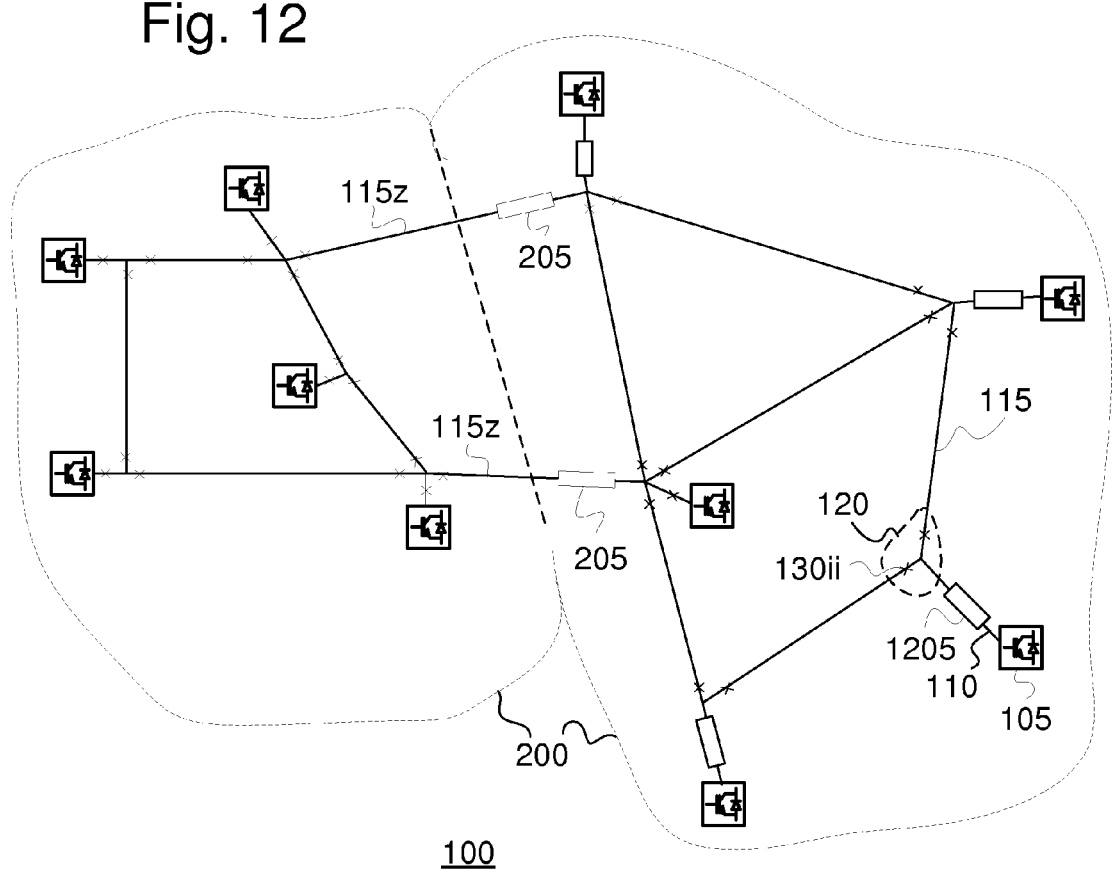
FIG. 12 is a schematic drawing of a DC grid which has been divided into two zones, and wherein the connecting HVDC lines in one zone are equipped with current limiters.

FIG. 12 schematically illustrates an example of a DC grid 100 wherein a current limiting mechanism in the connections 110 is provided by means of current limiters 1205 connected in the connection 110. The current limiter 1205 could be implemented and controlled in the manner described above in relation to current limiters 205. Typically, it will be sufficient if the current limiter 1205 is uni-directional and operable to limit a current flowing from the HVDC converter 105 towards the DC grid 100. In FIG. 12, current limiter 1205 is shown to have taken the place of an HVDC breaker 130i. However, an HVDC breaker 130i could additionally be provided. Such HVDC breaker 130i could for example be beneficial in order to limit the effects on the DC grid 100 from a fault in the connection 110 or in the HVDC converter 105 if a uni-directional current limiter 1205 is used.

The current limiter 1205 can advantageously be used to limit the current flowing into a faulty zone from an AC system connected to the faulty zone via an HVDC converter 130.

By combining a current-limiting possibility in the connections 110 with the dividing of the DC grid 100 into different zones 200, the fault current in a zone 200, wherein a fault has occurred, can be efficiently controlled to an acceptable level.

A current limiting mechanism in a connection 110 could advantageously be arranged to limit the current to lie within a regulation range which falls below the rated DC current of the HVDC converter 105 in case of a fault, in line with the methods discussed in relation to FIG. 6b. In limiting a fault current to a regulation range below the rated current of the HVDC converter 105, it is ensured that the switching units of the HVDC converter 105 will remain controllable. The amount of reactive power that the HVDC converter 105 will be capable of delivering to the connected AC power system will depend on the difference between the fault current through the connection 110 and the rated current of the HVDC converter 105—the larger this difference, the higher the amount of reactive power that can be delivered to the connected AC power system, thus facilitating for efficient control of the AC voltage in a manner so that the disturbances on the connected AC power system resulting from the fault in the DC grid will be minimized.

By means of the present invention, geographical spread of a DC voltage collapse in a DC grid 100 subjected to a fault will be limited, and thus, the invention facilitates for the establishment of large DC grids 100 without risking that a fault occurring in one part of the DC grid 100 will be devastating to the entire DC grid 100.

The above description has been made in terms a high voltage DC grid. However, the invention is equally applicable to DC grids comprising AC/DC converters of any voltage level, including Medium Voltage Direct Current (MVDC) grids comprising MVDC converters and MVDC breakers.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. A DC grid comprising:
   a plurality of AC/DC converters which are interconnected via DC lines, wherein
      the DC grid further comprises at least one current limiter which is capable of breaking the current at at least the rated voltage;
      the DC grid is divided into at least two zones by the at least one current limiter in a manner so that at least one of the at least one current limiter is connected in each of the DC line(s) by which two zones are interconnected; and
      the at least one current limiter dividing the at least two zones is adapted for limiting, but not breaking, a fault current that flows into a fault in a zone from neighbouring zones during a fault-on period; and
   in connection with a current limiter interconnecting a first and a second zone, a control system for controlling the current-limiting strength of the current limiter, the control system being operable to instruct, if a fault occurs in the first zone, the current limiter to limit the current flowing into the first zone from the second zone through the at least one current limiter, wherein
      the control system comprises a current measuring device arranged to measure the current through the current limiter; and the control system is operable to detect a fault, and if a fault has been detected, to adjust the current-limiting strength of the current limiter in a manner so that:
if the current through the breaker exceeds a first current threshold ($I_{max}$), the current-limiting strength is increased; and
if the current through the breaker falls below a second current threshold ($I_{min}$), the current-limiting strength is decreased.

2. The DC grid of claim 1, wherein
the at least one current limiter comprises a series connection of independently controllable breaker sections, wherein a breaker section comprises a parallel connection of a non-linear resistor and a semi-conductor switch of turn-off type.

3. The DC grid of claim 1, further comprising
a self-protective control system operable to generate a damage indication if the current limiter is at risk for thermal damage, and to generate, in response to such damage indication, a tripping signal instructing the current limiter, or a breaker protecting the current limiter, to break the current.

4. The DC grid of claim 1, wherein
the control system further comprises a voltage measuring device arranged to measure the voltage on at least one side of the current limiter; and
the control system is operable to detect a fault by checking if the voltage on at least one side of the current limiter has fallen below a first voltage threshold ($U_{low}$).

5. The DC grid of claim 1, wherein
the control system is operable to detect a fault by checking if the current through the current limiter has risen above the first current threshold.

6. The DC grid of claim 1, wherein
at least one connection connecting an AC/DC converter to the DC grid is provided with a current-limitation mechanism.

7. The DC grid of claim 1, wherein
at least one object in at least one zone is protected by an AC breaker connected to an AC/DC converter in said zone.

8. A DC grid comprising:
a plurality of AC/DC converters which are interconnected via DC lines, wherein
the DC grid further comprises at least one current limiter which is capable of breaking the current at at least the rated voltage;
the DC grid is divided into at least two zones by the at least one current limiter in a manner so that at least one of the at least one current limiter is connected in each of the DC line(s) by which two zones are interconnected;
the at least one current limiter dividing the at least two zones is adapted for limiting, but not breaking, a fault current that flows into a fault in a zone from neighbouring zones during a fault-on period;
the at least one current limiter comprises a series connection of independently controllable breaker sections, wherein each of the breaker sections comprises a parallel connection of a non-linear resistor and a semi-conductor switch of turn-off type; and
a control system for controlling the current-limiting strength of the current limiter, wherein
the control system is further operable to estimate the present energy-absorbing capacity of the non-linear resistors; and
the control system is operable to select which breaker section(s) should be opened or closed, if any, in dependence of the different energy absorbing capacities of the non-linear resistors.

9. A method of limiting the effects of a fault in a DC grid comprising a plurality of AC/DC converters which are interconnected via DC lines, the method comprising the steps of:
dividing the DC grid into at least two zones by series-connecting, in each of the DC line(s) by which two zones are interconnected, at least one current limiter capable of breaking the current at at least the rated voltage; and
limiting but not breaking, by the at least one current limiter, a fault current that flows into a fault in a zone from neighbouring zones during a fault-on period, wherein the DC grid comprises, in connection with the at least one current limiter dividing the at least two zones, a control-system for controlling the current-limiting strength of the current limiter;
detecting, in the control system, a fault; and
in response to detecting the fault, adjusting the current-limiting strength of the current limiter in a manner so that
if the current through the breaker exceeds a first current threshold ($I_{max}$), the current-limiting strength is increased; and
if the current through the breaker falls below a second current threshold ($I_{min}$), the current-limiting strength is decreased.

10. The method of claim 9, wherein
at least the second current threshold lies below the rated current of the transmission.

11. The method of claim 9, wherein
the second current threshold lies above the rated current of the transmission.

12. The method of claim 11, wherein
the detecting of the fault is performed by checking whether the current through the current limiter exceeds the first current threshold.

13. The method of claim 9, wherein
the detecting of the fault is performed by checking whether the voltage on at least one side of the current limiter has fallen below a first voltage threshold ($U_{low}$).

14. The method of claim 9, wherein
the current-limiting strength in the step of adjusting if the current exceeds the first current threshold is set in dependence of the difference between the present current level and the first current threshold; and
the current-limiting strength in the step of adjusting if the current falls below the second threshold is set in dependence of the difference between the present current level and the second current threshold.

15. The method of claim 9, wherein a current limiter comprises a number of individually controllable, series connected breaker sections, each comprising a parallel connection of a non-linear resistor and a semi-conductor switch of turn-off type, wherein
increasing the current-limiting strength comprises sending a blocking signal to at least one closed breaker section, if any breaker section is closed; and
decreasing the current-limiting strength comprises sending a firing signal to at least one open breaker section, if any breaker section is open.

16. The method of claim 15, further comprising
estimating the present energy-absorbing capacity of the non-linear resistors; and
selecting which breaker section(s) should be open or closed, if any, in dependence of the different energy absorbing capacities of the non-linear resistors.

17. The method of claim 9, wherein
the current limiter comprises a transition switch connected in parallel with a main switch;
said step of adjusting the current-limiting strength is conditional on the transitional switch being open; and
the method further comprises:
opening the transition switch, thus commutating the current to the main switch, if:
   the current through the current limiter exceeds a third current threshold ($I_{arm}$), wherein the third current threshold is above the expected current level during normal operation, or
   the voltage at a side of the current limiter goes below a second voltage threshold, wherein the second voltage threshold is below the expected voltage level during normal operation.

18. The method of claim 9, further comprising
generating a damage indication in dependence of estimations of the present energy-absorbing capacity of the current limiter indicating that the current limiter is at thermal risk; and
tripping the current limiter to break the current in response to said damage indication.

\* \* \* \* \*